United States Patent
Tatsuno et al.

(10) Patent No.: US 7,438,443 B2
(45) Date of Patent: Oct. 21, 2008

(54) LIGHTING DEVICE, IMAGE-READING DEVICE, COLOR-DOCUMENT READING APPARATUS, IMAGE-FORMING APPARATUS, PROJECTION APPARATUS

(75) Inventors: Hibiki Tatsuno, Kanagawa (JP); Kiichiro Nishina, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 220 days.

(21) Appl. No.: 10/942,908

(22) Filed: Sep. 17, 2004

(65) Prior Publication Data
US 2005/0111115 A1    May 26, 2005

(30) Foreign Application Priority Data
Sep. 19, 2003  (JP)  ............... 2003-329075
Nov. 19, 2003  (JP)  ............... 2003-389642

(51) Int. Cl.
*F21V 7/00*  (2006.01)
(52) U.S. Cl. .................. 362/297; 362/346; 362/347
(58) Field of Classification Search .......... 362/296–305
See application file for complete search history.

(56) References Cited

U.S. PATENT DOCUMENTS

| 4,304,479 | A | * | 12/1981 | Van Allen ................ 396/200 |
| 4,690,518 | A | | 9/1987 | Kouchiwa et al. |
| 4,738,517 | A | | 4/1988 | Nishina et al. |
| 4,753,522 | A | | 6/1988 | Nishina et al. |
| 4,836,664 | A | | 6/1989 | Nishina |
| 4,922,389 | A | * | 5/1990 | Nino .......................... 362/539 |
| 4,997,265 | A | | 3/1991 | Nishina |
| 5,311,364 | A | | 5/1994 | Kanoshima et al. |
| 5,680,254 | A | | 10/1997 | Ueda et al. |
| 5,781,324 | A | | 7/1998 | Nishina |
| 6,102,547 | A | * | 8/2000 | Matsuoto et al. ............ 362/16 |
| 6,636,283 | B2 | * | 10/2003 | Sasagawa et al. ............ 349/65 |
| 6,718,132 | B2 | | 4/2004 | Nishina |
| 2002/0101685 | A1 | | 8/2002 | Ohashi et al. |

FOREIGN PATENT DOCUMENTS

| JP | 6-22087 | 1/1994 |
| JP | 9-50510 | 2/1997 |
| JP | 9-219770 | 8/1997 |
| JP | 2002-93227 | 3/2002 |

OTHER PUBLICATIONS

U.S. Appl. No. 11/851,846, filed Sep. 7, 2007, Nishina.

* cited by examiner

*Primary Examiner*—Thomas M Sember
(74) *Attorney, Agent, or Firm*—Oblon, Spivak, McClelland, Maier & Neustadt, P.C.

(57) ABSTRACT

A lighting device includes an illumination face having a length and a width; a light-emitting element having a light-ray-releasing face the maximum length of which is equal to or less than the width of the illumination face; and a light-source unit that has an optical element which changes the direction of light rays released from the light-emitting element to be directed to the illumination face. The optical element has a concave-face reflecting unit having a cross section that is shaped into a quadratic curve or a pseudo quadratic curve, which is placed at least on one portion thereof, and a luminance distribution on the illumination face has a flat portion that is equal to or not less than a predetermined width.

58 Claims, 34 Drawing Sheets

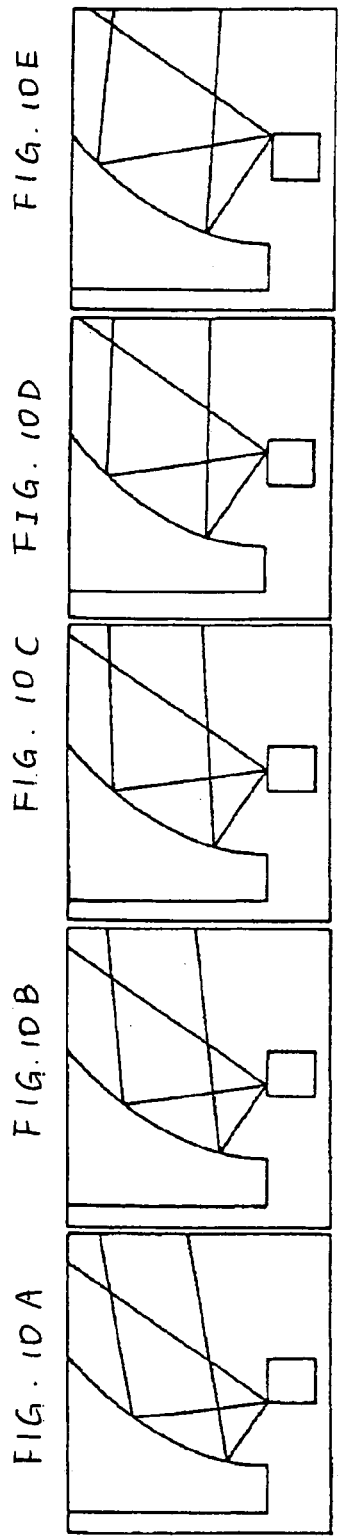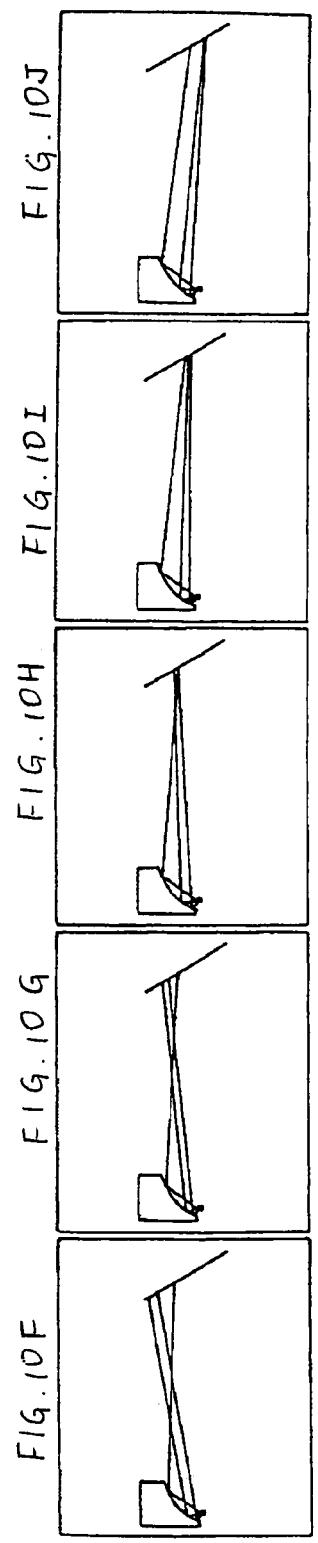

FIG. 42A
STATE IN WHICH LIGHT-EMITTING ELEMENT IS SHIFTED LEFTWARD BY 0.3 MILLIMETER ON X-AXIS

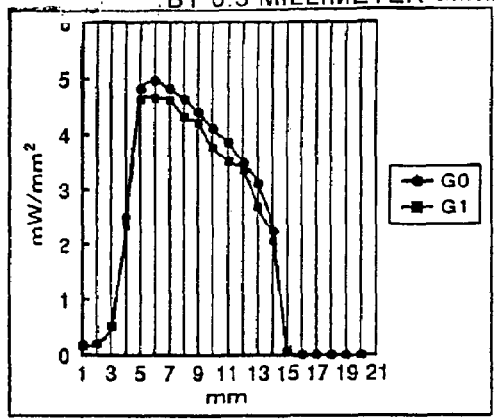

FIG. 42B
STATE IN WHICH LIGHT-EMITTING ELEMENT IS SHIFTED RIGHTWARD BY 0.3 MILLIMETER

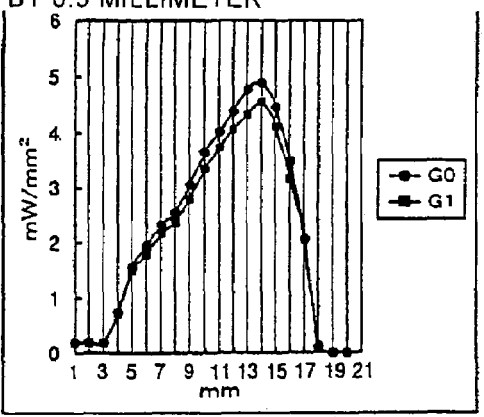

FIG. 42C
STATE IN WHICH LIGHT-EMITTING ELEMENT IS SHIFTED UPWARD BY 0.3 MILLIMETER ON Y-AXIS

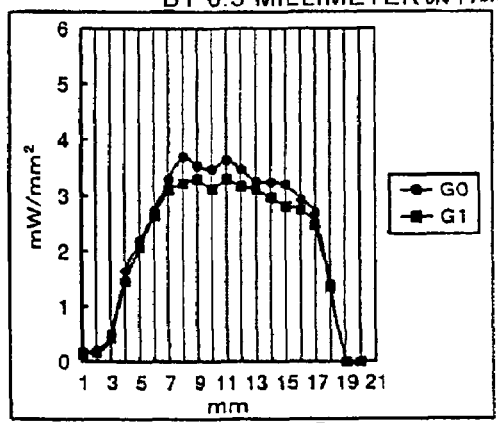

FIG. 42D
STATE IN WHICH LIGHT-EMITTING ELEMENT IS SHIFTED DOWNWARD BY 0.3 MILLIMETER

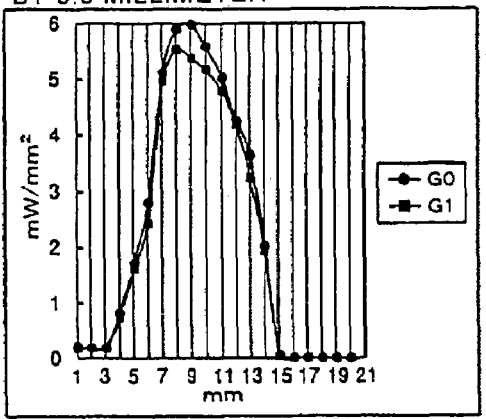

FIG. 42E
STATE IN WHICH LIGHT-EMITTING FACE IS TILTED BY 10 DEGREES TOWARD REFLECTING MIRROR

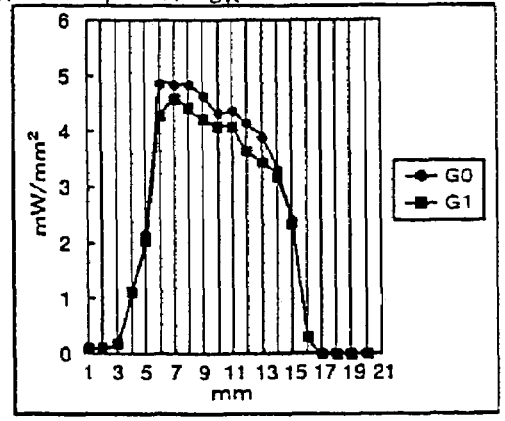

FIG. 42F
STATE IN WHICH IT IS TILTED BY 10 DEGREES TOWARD ILLUMINATION FACE SIDE

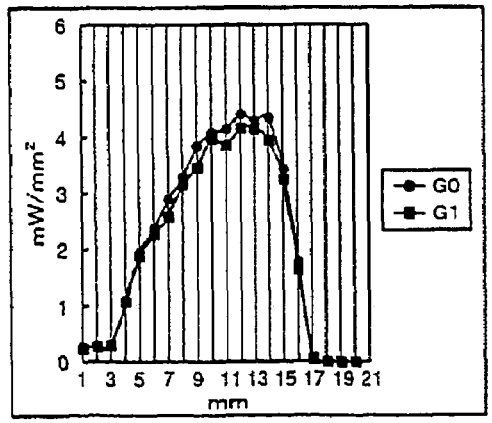

STATE IN WHICH LIGHT-EMITTING ELEMENT IS SHIFTED LEFTWARD BY 0.3 MILLIMETER ON X-AXIS

STATE IN WHICH LIGHT-EMITTING ELEMENT IS SHIFTED RIGHTWARD BY 0.3 MILLIMETER

STATE IN WHICH LIGHT-EMITTING ELEMENT IS SHIFTED UPWARD BY 0.3 MILLIMETER ON Y-AXIS

STATE IN WHICH LIGHT-EMITTING ELEMENT IS SHIFTED DOWNWARD BY 0.3 MILLIMETER

FIG. 48
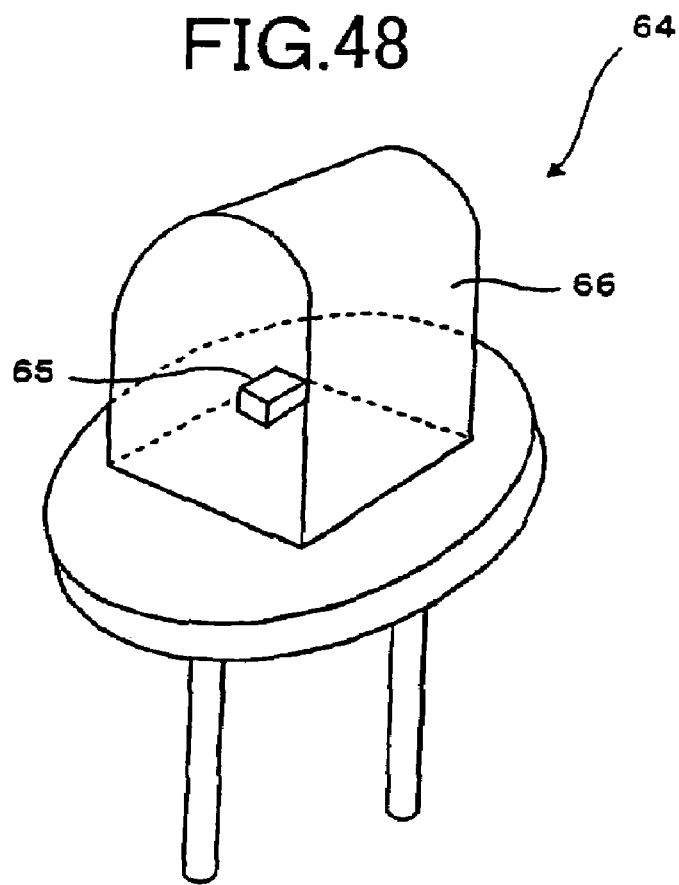
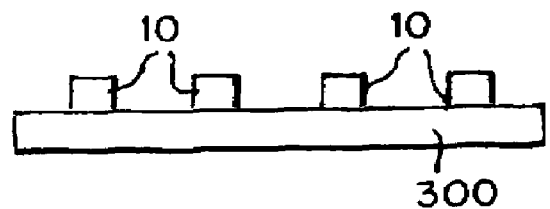
FIG. 49

LIGHTING DEVICE, IMAGE-READING DEVICE, COLOR-DOCUMENT READING APPARATUS, IMAGE-FORMING APPARATUS, PROJECTION APPARATUS

CROSS-REFERENCE TO RELATED APPLICATIONS

The present document incorporates by reference the entire contents of Japanese priority documents, 2003-329075 filed in Japan on Sep. 19, 2003 and 2003-389642 filed in Japan on Nov. 19, 2003.

BACKGROUND OF THE INVENTION

1) Field of the Invention

The present invention relates to a document lighting device to be used for a reading apparatus, such as a digital copying machine, an image scanner and a digital laboratory.

2) Description of the Related Art

In recent years, the light emitting diodes (LEDs) have been researched actively. As a result of that, the LEDs are being made brighter and brighter. The LEDs have long service life, high efficiency, high G-resistant property, and they can emit light of one color. As a result, the LEDs are being used in many fields. The LEDs are used, for example, in document lighting devices in image-reading devices such as digital copying machines and image scanners.

FIG. 36 is a schematic diagram of an image-forming apparatus having an image-reading device. The reference numeral 100 represents an image-forming unit and the reference numeral 200 represents an image-reading unit.

The image-forming unit 100 includes a drum-shaped latent-image bearing member 111. A charging roller 112 serving as a charging unit, a developing device 113, a transfer roller 114 and a cleaning device 115 are arranged around the latent-image supporting member 111. A "Corona charger" may be used as the charging unit. Further, an optical scanning device 117 such as an image-reading unit, which carries out an optical scanning process using a laser beam LB upon receipt of document information from an external device, is installed so that "an exposing process through optical writing" is carried out between the charging roller 112 and the developing device 113.

Upon carrying out an image-forming process, the image-bearing member 111, which is photoconductive and photosensitive, is rotated at a constant speed. As a result, the surface of the image-bearing member 111 is evenly charged by the charging roller 112 so that an electrostatic latent image is formed based on exposure through the optical writing by a laser beam LB of the optical scanning device 117. The electrostatic latent image thus formed is a so called "negative-working latent image" with an image portion being exposed. A cassette 118 housing sheets of copy paper P is detachably attached to the main body of the image-forming apparatus 100, and one sheet of the copy paper P on the topmost of the pile of the copy papers is fed by a paper-feeding roll 120, and the leading portion of the fed copy paper P is caught by a pair of resist rollers 119. The resist rollers 119 send the copy paper P to a transferring unit in synchronized timing with the shift of a toner image on the image-supporting member 111 to the transferring position. The copy paper P thus sent is superposed on the toner image at the transferring unit so that the toner image is electro-statically transferred by an action of a transferring roller 114. The copy paper P bearing the transferred toner image is sent to a fixing device 116, and the toner image is fixed in the fixing device 116, and the resulting copy paper P is discharged onto a tray 123 by a pair of paper-discharging rollers 122 through a transferring path 121. After the toner image has been transferred, the surface of the image-bearing member 111 is cleaned by a cleaning device 115 so that residual toner, paper powder and the like are removed. The latent-image bearing member 111, which is a photoconductive photosensitive member, forms the electrostatic latent image through uniform charging and optical scanning processes, and the electrostatic latent image thus formed is visualized as a toner image.

In the image-reading unit 200, a document 202 is placed on a contact glass plate 201, and a lighting unit (not shown) which is installed on a first moving member 203 placed below the contact glass plate 201, illuminates the document 202. Light rays, reflected from the document 202, are further reflected by a first mirror 203a of the first moving member 203, and then reflected by a first mirror 204a and a second mirror 204b of a second moving member 204 to be directed to a reduction image-forming lens 205 so that an image is formed on a line sensor 206.

Upon reading a document in the length direction, the first moving member 203 is shifted rightward in the figure at a speed V, and simultaneously, the second moving member 204 is shifted rightward at a speed ½·V so that the reading process is carried out over the entire document.

Normally, a document-lighting device to be used for the image-reading device needs to have virtually the same length as the document width to illuminate the document; therefore, with respect to the application method for LEDs as the document-lighting device, a number of LED elements are arranged, and used as an array format.

Although the current LEDs have the superior characteristics, absolute brightness of each of the elements is not sufficient so that they are not suited as a lighting device for an image-reading device. Because of this drawback of the LEDs, their use is restricted to low-speed reading apparatuses and compactness-serious apparatuses. On the other hand, cold cathode-ray fluorescent lamps are mainly used in high-speed reading apparatuses and large-size apparatuses.

One approach to solve the problem with the LEDs is to use a number of LEDs and constitute an LED array to thereby increasing total quantity of light. However, since light of the LED array diffuses widely, this approach is not so effective. Moreover, since the LED array consumes great power, this approach opposes the current energy-saving demands.

FIGS. 37 and 38 are cross-sectional views of a lighting device in which a rod-shaped light source is used. The reference numeral 1 represents the rod-shaped light source such as a cold cathode-ray fluorescent lamp, 2 and 2' represent mirror-face members, each having a partially cylinder-shaped concave-face reflecting unit serving as an optical element, 3 represents an illumination face such as a document face, and 4 indicates a luminance distribution curve in the sub-scanning direction on the illumination face. For convenience of explanation, the mirror-face member is indicated by only the reflection face. The same is true for the other figures.

Total quantity of light output from the rod-shaped light source is increased in the following manner. That is, light rays output from the rod-shaped light source 1 are reflected by the mirror-face member 2 having the partial cylinder shape so that the light rays are collected on the document face 3. Here, the partially cylinder shape, which is also referred to as a cylindrical shape, refers to a shape that has a cross section corresponding to one portion of a quadratic curve, such as a circle, an ellipse, a parabolic curve and a hyperbolic curve, or a shape close to one of these shapes, and is designed so that the length of the light source in the length direction of the rod-shaped light source is set to virtually the same length as the length of the illumination face.

FIG. 39 is a schematic diagram that depicts a positional relationship of light-receiving elements in a digital copying machine and an image scanner. The reference numeral 5 represents an image-forming lens, 6 represents a light-receiving element, and 7 represents a single light-receiving unit.

In the digital copying machine and the image scanner, as shown in the figure, light rays, reflected from a document, are received by the single light-receiving unit 7 of the light-receiving element 6 through the image-forming lens 5. In the light-receiving element 6 such as a CCD sensor, the width of the single light-receiving unit 7 is normally as narrow as 0.05 millimeter to 0.1 millimeter. In other words, in the case of the equal-magnification image-forming process, only the area having the corresponding narrow width is read on the document face. Therefore, as shown by the example of FIG. 38, when light rays from the light source are sharply converged, the position of the luminance distribution curve 4 tends to deviate due to deviations in illumination position caused by deviations and the like in a mirror angle to greatly vary the quantity of light to reach the single light-receiving unit 7, with the result that an image to be formed is greatly affected.

The figure depicts an example in which an equal-magnification sensor is used, and, for example, even when a 1/10 reduced image is formed by using a reduction optical system, the width of the illumination area on the document side to be image-formed on the single light-receiving unit 7 becomes only 1 millimeter at most, with the result that the same problems are raised.

FIGS. 40A, 40B, 40C, and 40D are for explaining how an illumination distribution curve changes with the image-reading position. FIGS. 40A and 40 B depict a case in which the width of an illumination distribution curve is comparatively narrow, and FIGS. 40C and 40B depict a case in which the width of an illumination distribution curve is comparatively wide. Here, the term, "comparatively", refers to a width in comparison with the width of the image-reading area.

FIGS. 40A and 40C depict normal states.

In digital copying machines, the width of the light-receiving unit is as narrow as 0.1 millimeter. Therefore, as shown in FIG. 40B, when the center position of the illumination distribution curve 4 deviates from the reading portion, the luminance of the reading area drops greatly. Thus, in the digital copying machine and the image scanner, there have been demands for a document lighting device which has a wide luminance distribution curve 4 in the sub-scanning direction as shown in FIGS. 40C and 40D, and is less susceptible to luminance difference in the reading area even when the center position of illumination deviates from the reading portion. For this purpose, it is preferable to form a portion with little luminance irregularity that has a width greater than the width (for example, approximately 1 millimeter for one side) consisting of a width required for the reading process (approximately, the maximum 1 millimeter in the example) and a fluctuation width (for example, approximately 1 millimeter for one side) due to mechanical errors and the like added thereto, near the maximum value in luminance distribution, that is, a flat portion in luminance.

To satisfy these conditions, with respect to the application of a rod-shaped light-source-use reflecting mirror, an arrangement has been proposed in which, as shown in FIG. 37, a document face is illuminated with a wide width without converging too much light although the efficiency is low, or an appropriate luminance distribution is formed by combining a plurality of planes (for example, see Japanese Patent Application Laid-Open No. 6-22087 (page 3, FIG. 1)). However, since the premise of this arrangement is to use a rod-shaped light source, it is difficult to apply this method to LEDs having a size much smaller than this light source. It is mainly because there is a difference in size ratios between the width of the illumination face and the light-emitting unit of the light source. The width in the sub-scanning direction of the illumination face is about several millimeters; however, the size of the light-emitting unit of the rod-shaped light source is greater than this size, while the size of the light-emitting unit of the LED is smaller than the width of the illumination face. This difference causes differences in the distance between the light source and the illumination face and in the size of reflecting mirror.

The application of the same structure as that of FIG. 37 in an attempt to use an LED array fails to achieve the main objective for compensating for insufficient brightness of the LEDs since the light utilization efficiency is very low.

Another arrangement for utilizing the LEDs as an illumination light source has been proposed (for example, see Japanese Patent Application Laid-Open No. 2002-93227 (page 4, FIG. 1)). However, the arrangement suggested in Japanese Patent Application Laid-Open No. 2002-93227 describes nothing about the luminance distribution in the illumination area.

The applicant of the present invention has proposed an arrangement that provides a luminance distribution similar to luminance distributions shown in FIGS. 40C and 40D (Japanese Patent Application No. 2003-140927). In this arrangement, a light-incidence face is placed near the light-ray-releasing face of a point light source as an optical element, and a light-directing member is prepared with its light-releasing face facing the reading area. With this arrangement, the target luminance distribution is exemplarily obtained; however, a reflection plate is required in addition to the light-directing member so that the arrangement becomes more complex, resulting in the subsequent high costs.

SUMMARY OF THE INVENTION

It is an object of the present invention to solve at least the problems in the conventional technology.

A lighting device according to an aspect of the present invention includes an illumination face having a length and a width; a light-emitting element having a light-ray-releasing face the maximum length of which is equal to or less than the width of the illumination face; and a light-source unit that has an optical element which changes the direction of light rays released from the light-emitting element to be directed to the illumination face. The optical element has a concave-face reflecting unit having a cross section that is shaped into a quadratic curve or a pseudo quadratic curve (hereinafter, "a quadratic curve"), which is placed at least on one portion thereof, and a luminance distribution on the illumination face has a flat portion that is equal to or not less than a predetermined width.

A lighting device according to another aspect of the present invention has an illumination face having a predetermined length and width, and applies light onto the illumination face to utilize reflected light from the illumination face. The lighting device includes a light-source unit having a solid-state light-emitting element; and an optical element that has a light-ray incident opening near a light-ray releasing face of the light-emitting element and a concave-face reflecting unit that has a partially cylinder shape having a light-ray releasing opening that faces the illumination face, with a cross sectional shape thereof having a quadratic curve or a pseudo quadratic curve (hereinafter, "a quadratic curve"). An illumination area derived from light applied from the light-emitting element has a high-luminance distribution area having virtually a constant luminance, with the high-luminance distribution area being made virtually coincident with the illumination face.

An image-reading device, a color-document reading apparatus, an image-forming apparatus, and a projection apparatus according to other aspects of the present invention include the above lighting device.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 10A to 10J are drawings that depict one example of a converged state of light rays on an illumination face;

FIGS. 42A to 42F are drawings which depict a luminance distribution upon occurrence of a deviation in the lighting device shown in FIGS. 41A to 41C;

FIG. 48 is a schematic diagram that depicts a light-emitting-element-use lens that is suitably used in the lighting device of the present invention; and FIG. 49 is a schematic of optical elements arranged on the same circuit substrate.

DETAILED DESCRIPTION

Exemplary embodiments of a lighting device, an image-reading device, a color-document reading apparatus, an image-forming apparatus, and a projection apparatus according to the present invention are explained below in reference to the accompanying drawings. However, before explaining of the embodiments (examples) of the present invention, the principle of the present invention will be explained first.

Figure 1:
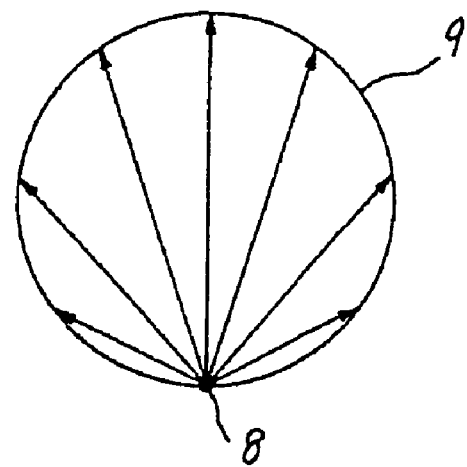
FIG. 1 is a drawing that depicts a luminous intensity distribution of an LED that is one example of a solid-state light-emitting element of the present invention.

FIG. 1 depicts luminous intensity distribution of an LED, which is an example of a solid-state light-emitting element. The reference numeral 8 represents a point from where light is emitted (light-emitting point), and 9 represents a luminous intensity distribution in a cross section.

The luminous intensity distribution takes various forms depending on differences in characteristics of the emitter; however, in general, a luminous intensity distribution curve having a circular cross section is used to indicate the luminous intensity distribution. When the light-emitting point is really a point, the luminous intensity distribution is spherical. Since the LED can be considered as a point light source, when viewed mcroscopically, its luminous intensity distribution curve becomes the one shown in FIG. 1. In the case when the LED is dealt microscopically, since the light-emitting portion has a size, all the light-emitting portions are dealt as those each having the luminous intensity distribution shown in the figure. In the case of the luminous intensity distribution shown in the figure, each of the light-emitting angles is 180 degrees; however, the angle range of quantity of light that is actually utilized is narrower than this angle. Here, an angle which forms a luminance of ½ of the maximum luminance is referred to as a half-value angle, and when the cross section has a circular shape as shown in the figure, the half-value angle is 60 degrees. Since the luminous intensity distribution shown in the figure has a center-symmetric form, the range of effective light rays becomes 120 degrees. Even when the cross section is represented by not a circle, but an ellipse or another shape, the approximate range of effective light rays is given by using the half-value angle.

Figure 2A:
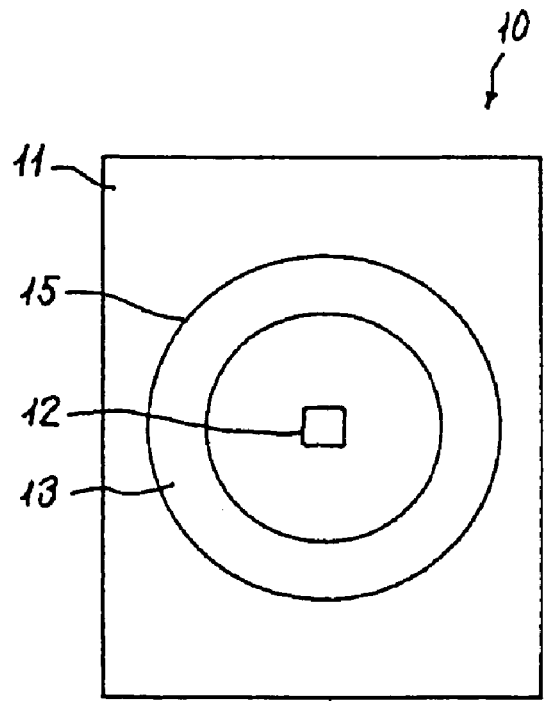
FIGS. 2A and 2B are drawings that depict one example of the LED to be used in the present invention.
Figure 2B:
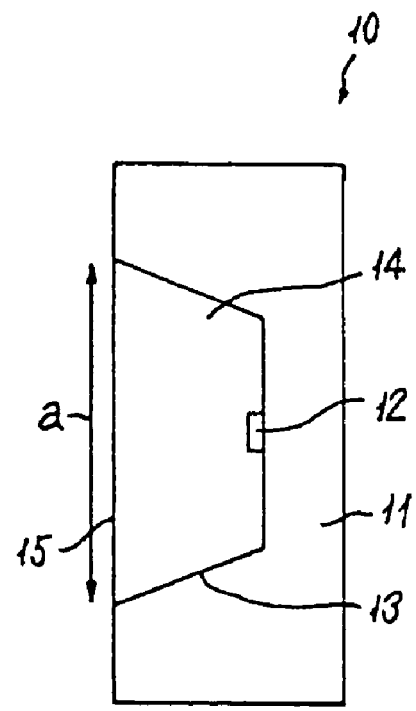

FIGS. 2A and B are drawings that depict an example of an LED 10 that can be used in the present invention. FIG. 2A is a front view, and FIG. 2B is a side view. The reference numeral 11 represents an LED base member, 12 represents a light-emitting unit, 13 represents a reflector, 14 represents a transparent sealant member, and 15 represents a light-ray releasing face.

The LED 10 is a rectangular parallelepiped. The LED 10 has a structure in which a transparent resin member, referred to as a chip, which has a light-emitting point 12 and a reflector 13 formed on a slant face of a cone shape, and serves as a sealant member 14, is filled in the center of a recessed section of an LED base member 11 having the recessed section having a reversed conical trapezoidal shape in the center thereof, and the end face of the sealant member 14 forms a light-ray releasing face 15. The light ray that exerts the maximum value of quantity of released light rays is released from the center of the light-emitting point 12 in a direction perpendicular thereto. For convenience of explanation, this is referred to as the light axis of the LED. The same is true for the rest of the explanation. The light axis is also perpendicular to the light-ray releasing face 15. In this structure, since there are light rays reflected by the reflector 13, the light-ray releasing face 15 is regarded to serve as a new light source. The light-ray releasing face 15 has a circular shape, and supposing that the diameter is "a", "a" is sometimes set to a range from 1 millimeter to 2 millimeters, with the result that it is not ignorable in comparison with the width (about 1 millimeter+permissible error width of about 2 millimeter) of the illumination face. Therefore, the LED 10 is sometimes referred to as a facial light-emitting element.

Figure 3A:
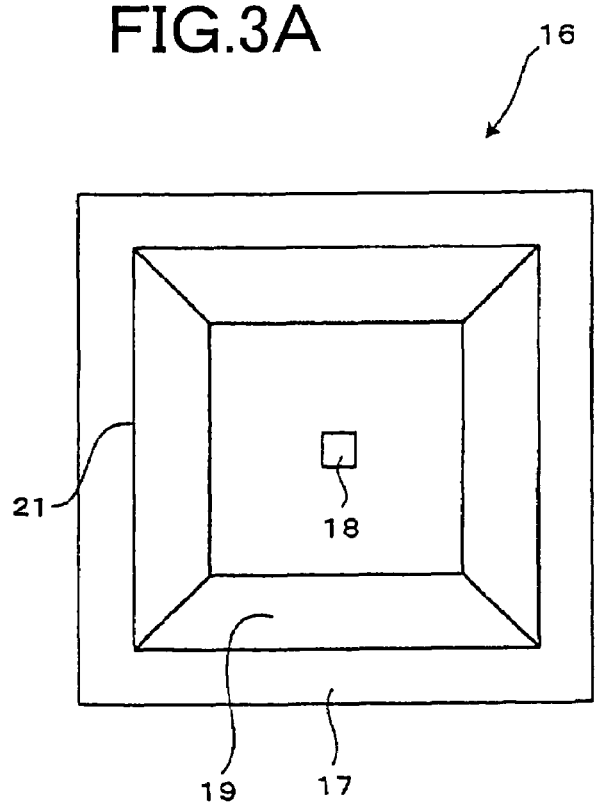
FIGS. 3A and 3B are drawings that depict another example of the LED to be used in the present invention.
Figure 3B:
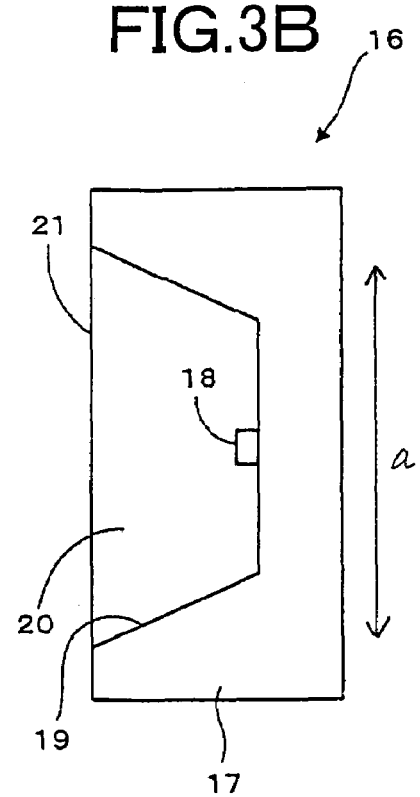

FIG. 3A is a front view, and FIG. 3B is a side view of another example of an LED 16 that can be used in the present invention. The reference numeral 17 represents an LED base member, 18 represents a light-emitting unit, 19 represents a reflector, 20 represents a transparent sealant member, and 21 represents a light-ray releasing face.

The LED 16 is different from the LED 10 in that the recessed section, formed in the LED base member 17, has a reversed pyramid trapezoidal shape.

Therefore, the light-ray releasing face 21 forms a rectangular shape including a square. The length of one side of the light-ray releasing face 21 is "a".

The transparent sealant member 14 may made by mixing a fluorescent material in some other material. It is assumed here that the chip is made from InGaN, which emits blue light, and a YAG fluorescent material is used. Thus, when the chip emits blue light, the fluorescent material is simultaneously excited to emit yellow fluorescent light. Since blue and yellow are complementary colors to each other, the two colors are recognized as white light, when these lights are emitted outside together.

Some LEDs emit white light without the necessity of using a fluorescent material. Although not shown in figures, the LED of this type has a structure in which a plurality of chips are arranged on the same face, with light emissions having respectively different colors, so that when all of these are mixed, the resulting light ray is recognized as white light. For example, when two chips are used, those chips which emit blue light and yellow light respectively are used in the same manner as described above. When three chips are used, those chips which emit red light, blue light and yellow light, that is, colors corresponding to so-called three primary colors, are used.

The present invention includes all the LEDs that carry out these white light emissions.

Figure 4A:
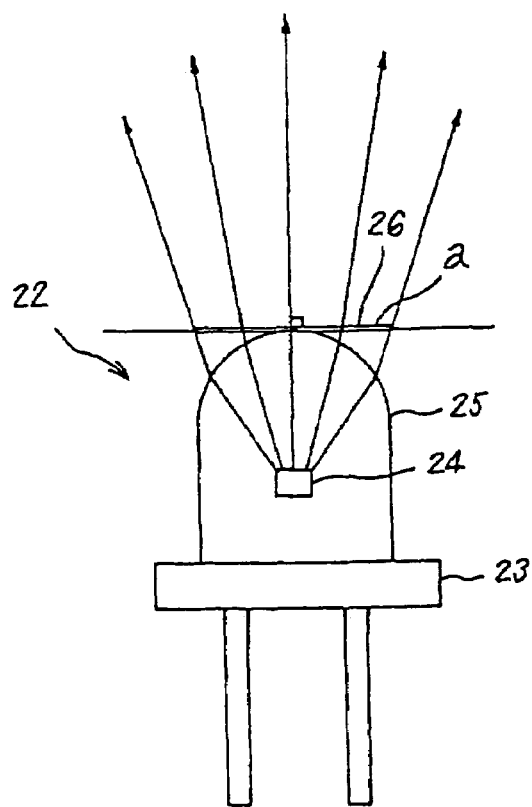
FIGS. 4A and 4B are drawings that depict still another example of the LED to be used in the present invention.
Figure 4B:
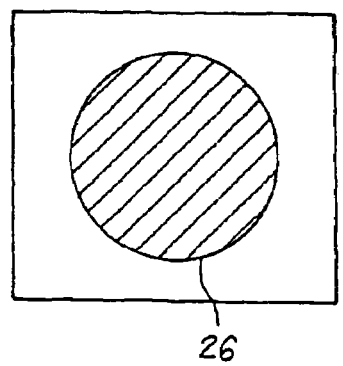

FIG. 4A is a side view and FIG. 4B is a virtual light-ray releasing face of still another example of an LED 22 that can be used in the present invention. The reference numeral 23 represents an LED base member, 24 represents a light-emitting unit, 25 represents a lens unit and 26 represents a virtual light-ray releasing face.

The LED 22, which is referred to as a shell type, is provided with the light-emitting unit 24 that is placed virtually in the center of the LED base member 23 and the lens unit 25 having a virtually semi-spherical shape, which is transparent and placed on the light-ray releasing side of the LED. The center of the spherical face of the lens unit 25 is designed to be located above the light-emitting unit 24 in the figure. The angle at which the lens unit 25 is viewed from the light-emitting unit 24 is exemplarily set to equal to or not less than the half-value angle of the luminous intensity distribution of the light-emitting unit 24.

The lens unit 25 on the base member side 23 forms a cylinder-shaped portion 25', and light rays that are emitted from the light-emitting unit 24 and released outside through the cylinder-shaped portion 25' are not directed toward the illumination face so that these become ineffective light rays. Since effective light rays are refracted toward the side closer to the light axis, when released from the lens unit 25, the spreading angle of the light rays after released from the lens unit 25 becomes smaller than the releasing angle of the effective light rays when released from the light-emitting unit 24.

In this arrangement, supposing that a range in which effective light rays are present within an in-plane that is perpendicular to the light axis including the apex of the lens unit 25 forms the virtual light-ray releasing face 26, and that its diameter is "a", these members are dealt in the same manner as the light-ray releasing face 15, shown in the figure before the above-mentioned figure, and the light-ray releasing face 21 shown in the above-mentioned figure.

Figure 5A:
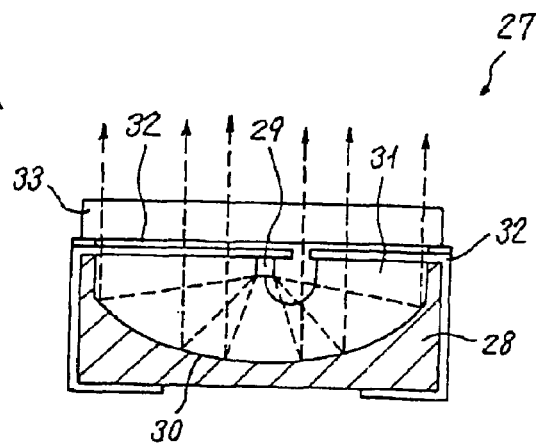
FIGS. 5A and 5B are drawings that depict the other example of the LED to be used in the present invention.
Figure 5B:
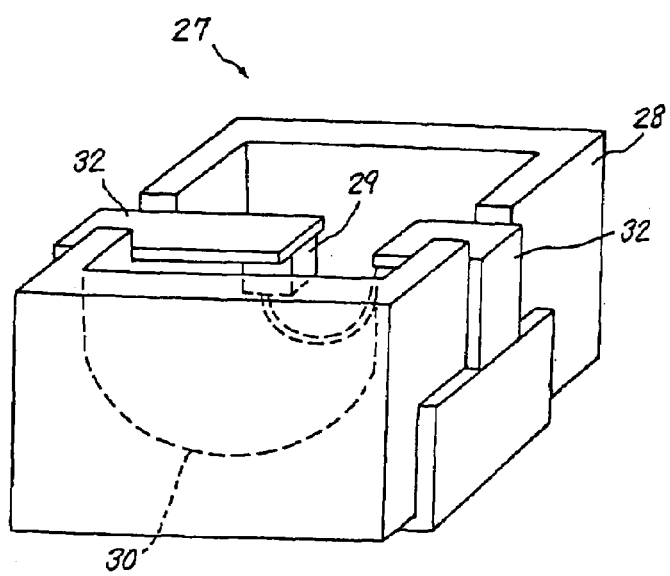

FIG. 5A is a schematic cross-sectional view and FIG. 5B is a perspective view (some of the parts have not been shown) of still another example of an LED 27 that can be used in the present invention. The reference numeral 28 represents a case, 29 represents a light-emitting unit, 30 represents a reflector, 31 represents a sealant member, 32 represents a lead and 33 represents a transparent lid.

The LED 27 is provided with the reflector 30 having a partially cylinder shape with its reflective portion facing up, which is placed in the case, and the light-emitting unit 29 is placed with its light-emitting face facing down toward the reflecting face. The sealant member 31, made of transparent resin is injected between the reflector 30 and the light-emitting unit 29. The light-emitting unit 29 is connected to the lead 32 that stretches onto the upper face of the case from outside of the case, and the transparent lid 33 is bonded to its upper face to protect the inside thereof.

Light rays, released from the light-emitting unit, reach the reflector, and are reflected by this and released outside from the transparent lid 33. Although one portion of the released light rays, which corresponds to the reflected light rays that have been shielded by the light-emitting unit 29 itself and the lead 32, is omitted, the area of the transparent lid 33 through which the light rays are allowed to pass is defined as a light-ray releasing face. When the cross section of the reflector 30 forms a parabolic face with the light-emitting unit 29 being placed to be coincident with its focal point, in the cross section shown in FIG. 5A, the light rays are released as parallel light rays. In this structure, the light-ray releasing face has virtually a square shape, and the length of one side is indicated by "a".

In the same manner as the LED shown in FIG. 2A, the LEDs shown in FIGS. 3A, 4A, and 5A are also referred to as facial light-emitting elements.

Normally, one or more of these LEDs are directly soldered onto a circuit substrate 300 containing circuits such as a driver in most cases. See FIG. 49. Moreover, since optical elements such as reflecting mirrors, which will be described later, require considerably strict positioning processes with respect to the light-emitting point, not an arrangement in which the optical elements and the circuit substrate are attached in a separated manner, but an arrangement in which after the optical elements have been attached while being properly positioned on the circuit substrate, these are attached to the structural body, is preferably used.

Figure 6:
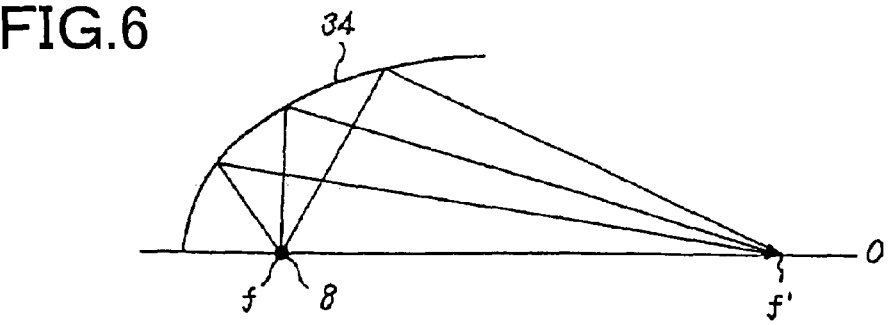
FIG. 6 is a conceptual drawing that depicts a light path when a point light source is placed at a focal point of a reflecting mirror having a cross section with an elliptical shape.
Figure 7:
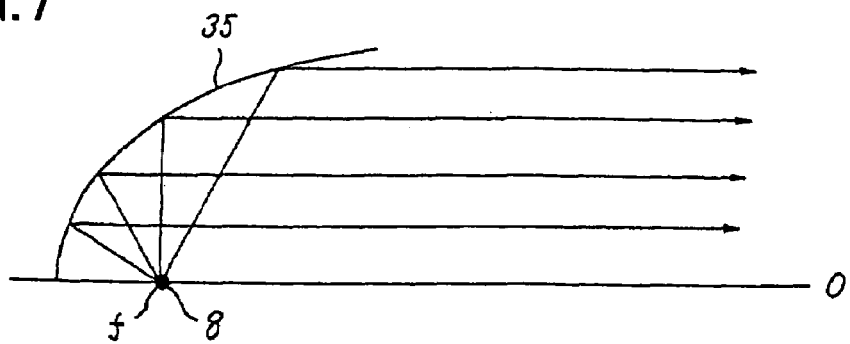
FIG. 7 is a conceptual drawing that depicts a light path when a point light source is placed at a focal point of a reflecting mirror having a cross section with a parabolic line shape.
Figure 8:
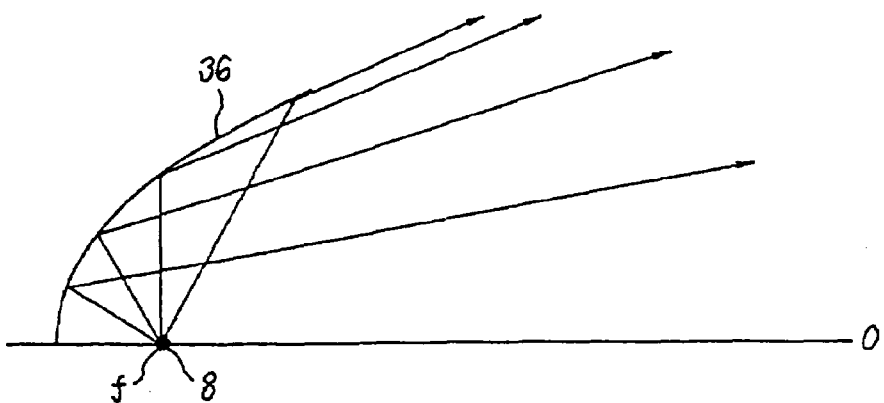
FIG. 8 is a conceptual drawing that depicts a light path when a point light source is placed at a focal point of a reflecting mirror having a cross section with a hyperbolic line shape.

FIG. 6 is a conceptual drawing that depicts a light path when a point light-source is placed at the focal point of a reflecting mirror having an elliptical shape in its cross section. FIG. 7 is a conceptual drawing that depicts a light path when a point light-source is placed at the focal point of a reflecting mirror having a parabolic line in its cross section. FIG. 8 is a conceptual drawing that depicts a light path when a point light-source is placed at the focal point of a reflecting mirror having a hyperbolic line in its cross section.

In FIGS. 6 to 8, reference numerals 34, 35, and 36 respectively represent reflecting mirrors. Symbols f and f' represent focal points, and O represents a symmetric axis that connects the apex and the focal point of each of the curves, and is referred to as a light axis in these examples.

The elliptical reflecting mirror shown in FIG. 6 has two focal points, and light rays, diffused from a light source placed at one of the focal points f closer to the apex of the reflecting mirror, are converged to the other focal point f' on the light axis.

In the parabolic face mirror shown in FIG. 7, diffused light rays from a light source placed at the focal point f form light rays that are in parallel with the light axis.

The hyperbolic face mirror shown in FIG. 8 also has two focal points although the definition of the focal point is different from that of the two examples. Diffused light rays from a light source placed at one of the focal points are diffused as if they were released from the other focal point.

To obtain a virtually constant luminance with a wide width that is one of the objectives of the present invention, the position at which the illumination face is placed needs to be devised. For example, in the case shown in FIG. 6, the illumination position is shifted on the front side of the other focal point or on the rear side of the other focal point. In an actual arrangement, the illumination face is tilted to a certain degree with respect to the light axis. When the target distribution is not obtained even with these arrangements, the light source itself needs to be shifted from the focal point position. The same is true for the arrangements shown in FIGS. 7 and 8.

Each of FIGS. 6 to 8 depicts the light source as an ideal point light source; however, as described earlier, in the actual LED, the light-ray releasing face has a certain degree of size, and it is impossible to regard the light source as a point light source. This inevitably means that even when the light-source center is placed at the focal point position, light-emitting units are also present at positions out of the focal point. Therefore, the luminance on the illumination face is given as a composition of light rays released from all the light-emitting units derived from continuous light sources each having a size.

Although not shown in the figures, in the case of a circular cross section, when a light source is placed with a shift from the center, although there is nothing to be referred to as a focal point, light rays are converged on a virtually specific position on the opposite side with the center interpolated in between even though the precision is poor. When a sharp converging process is not desired as in the case of the objective of the present invention, this function is also applicable. In this case, a point on the circle closest to the center of the light-emitting unit is defined as an apex, and a line connecting the point and the center of the light-emitting unit is used as the light axis.

Moreover, although the quadratic curve to be used as the mirror face is also dealt as an ideal curve, it is difficult to produce a quadratic curve (a quadratic curved face when viewed three-dimensionally) with high precision; therefore, short straight lines may be continuously connected to approximately form a desired quadratic curve, that is, a pseudo quadratic curve. Although the precision is poor, from the original objective of not allowing the luminance distribution to have a sharp peak value, no problems are particularly raised. For convenience of explanation, the following description will discuss the quadratic curve in all the cases; however, the pseudo quadratic curve may be applied to each of the cases.

Figure 9:
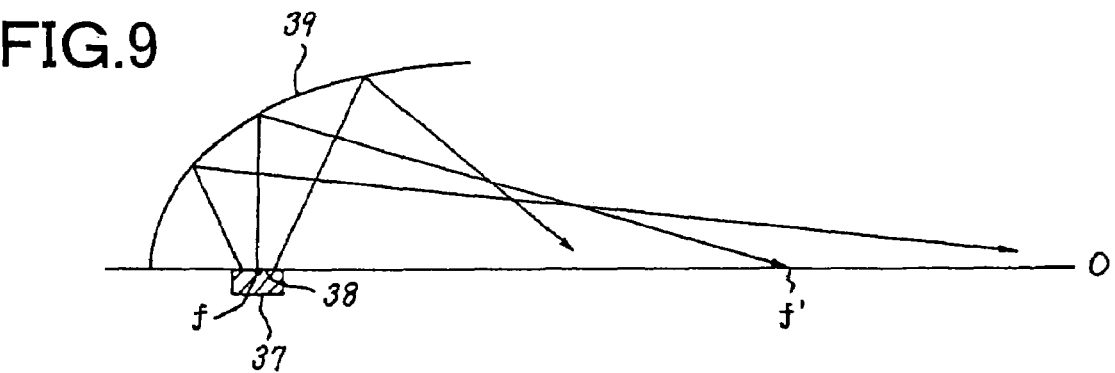
FIG. 9 is a drawing that depicts a state of reflection of light rays when a facial light-emitting element is placed at the focal point position of a reflecting mirror having an elliptical shape.

FIG. 9 is a drawing that depicts a state of reflected light rays when a facial light-emitting element is placed at the focal point position of an elliptical face reflecting mirror. The reference numeral 37 represents an LED serving as the facial light-emitting element, reference numeral 38 represents a light-ray releasing face, and 39 represents an elliptical face reflecting mirror.

As shown in FIG. 9, light rays, released from the center of the light source placed at the position of one of the focal points f, are allowed to reach the other focal point f'; however, light rays, released from light-emitting units placed on the side closer to the apex of the reflecting mirror, are all allowed to cross the light axis at positions farther from the other focal point f'. In contrast, light rays, released from light-emitting units placed on the side farther from the apex of the reflecting mirror, are allowed to cross the light axis at positions closer from the other focal point f'.

In this manner, when a light source has a certain size, the resulting light rays spread in a considerably wide range, even when an elliptical face reflecting mirror is used.

FIGS. 10A to 10J are drawings that depict one example of a light-converging state for light rays with respect to the illumination face. These figures are derived from a lighting device constituted under conditions shown by a fifth example that will be described later. Since drawing a number of light rays makes the figures complex, five points, which have virtually even intervals, and include the center, are indicated as light-emitting points, and one light ray that proceeds virtually upward and two light rays, each having an angle of 45 degrees, laterally on the right or left side, that is, total three light rays, are indicated as light rays. FIGS. 10A to 10E depict states of light rays between the light-emitting point and the concave-face reflecting unit, which are varied depending on the difference in the positions of the light-emitting points; and FIGS. 10F to 10J are enlarged drawings that depict states of light rays between the light-source unit and the illumination face in the same manner.

In FIG. 10C, a position on the center line of the light-emitting element is selected as the light-emitting point; in FIGS. 10A and 10E, positions, which correspond to 90% of the distance from the center of the light-emitting element to each of the end portions, are selected as the light-emitting points; and in each of FIGS. 10B and D, a position located at the mid-point between these points is selected as the light-emitting point.

In FIGS. 10A to 10E, there are not any great differences in the states of reflected light rays caused by differences in the positions of the light-emitting points; however, as indicated by FIGS. 10F to 10J, even a slight difference in positions of the light-emitting points causes a considerable difference in deviations in light rays on the illumination face.

Figure 11A:
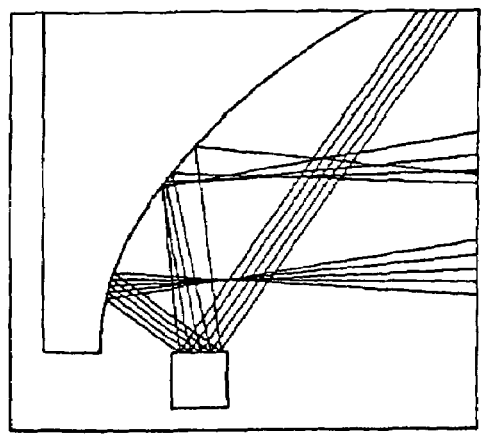
FIGS. 11A and 11B are drawings that depict a composite state of light-ray drawings shown in FIGS. 10A to 10J.
Figure 11B:
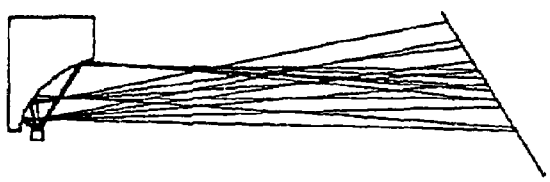

Each of FIGS. 11A and 11B is a drawing formed by composing light-ray drawings shown in FIGS. 10A to 10J; and FIG. 11A is a drawing formed by composing FIGS. 10A to 10E, FIG. 11B is a drawing formed by composing FIGS. 10F to 10J, and FIG. 11C depicts a curve that indicates the light quantity distribution on the illumination face.

Figure 11C:
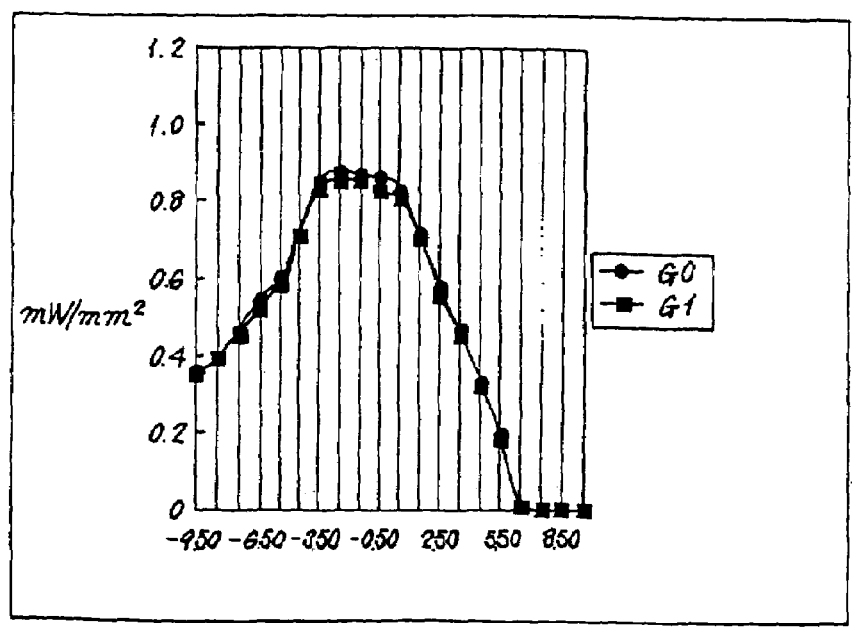
FIG. 11C is a drawing that depicts a curve that indicates the light quantity distribution on the illumination face.

FIG. 11C is a drawing that depicts the results that are obtained by tracing total 3000,000 light rays within ±90 degrees with respect to a perpendicularly upward direction from each of the light-emitting points in a circular luminous intensity distribution. The results are common with respect to all the examples 1 through 9.

In FIG. 11C, curve G0 indicates luminance distribution near the center in the main scanning direction, and G1 indicates luminance distribution near an end in the main scanning direction. The length of the illumination area is set to 20 millimeters. The axis of abscissas depicts an area having a width of 20 millimeters near the center in the sub-scanning direction, which includes an area that is actually used. This area is divided into 20 equal sections with 1 millimeter intervals, and a total energy entered each of the divided sections is plotted in the center of the corresponding section.

In general, curve G1 tends to become lower than curve G0, and this phenomenon is referred to as shading. With respect to the method for correcting the shading, various methods have been established; therefore, it is not necessary to concern the difference between curve G0 and curve G1 so much. Fluctuations within each of the curves tend to cause more problems.

When composed in a manner as shown in FIG. 11A, fluctuations in the reflection direction due to differences in the positions of the light-emitting points are clearly indicated. When FIG. 11B is viewed, spreading of the light ray on the illumination face is clearly indicated. When FIG. 11C is viewed, the state of the luminance distribution in association with the reading range is shown. Here, the reading range in the sub-scanning direction is set to 1 millimeter, and the permissible error range of errors in the mechanism and the like is set to ±1 millimeter. In other words, it is determined whether the objective has been achieved based on whether the light quantity distribution curve has a predetermined flat portion having a width of equal to or not less than 3 millimeters within a maximum luminance distribution range. In this case, the predetermined flat portion refers to a portion in which, even when, upon determination of a mechanism, its luminance is not the same as a designed value, the rate of change is maintained within a range that causes no problems in practical use upon handling monochrome images, by electrically correcting AGC and the like, and the permissible range of the rate of change is about 30%. In the case when color images are handled, to maintain deviations in color balance in the three primary colors within a correctable range rather than to correct AGC, the permissible range of the rate of change is set to about 12%. Thus, the predetermined flat portion is referred to as a high luminance distribution area.

Upon designing, virtually the center position of the width of the luminance distribution is used as a target reading center position, the area is preferably maintained within the rate-of-change range with a range having 1.5 millimeters on each of the sides of the center position. For example, in the case of FIG. 11C, it seems that a range that is regarded as the flat portion extends 4 to 5 millimeters. Within the total 3 millimeters ranges sandwiching the center position of the width of the flat portion, the rate of change is about 3% on curve G1, which is greater.

Figure 37:
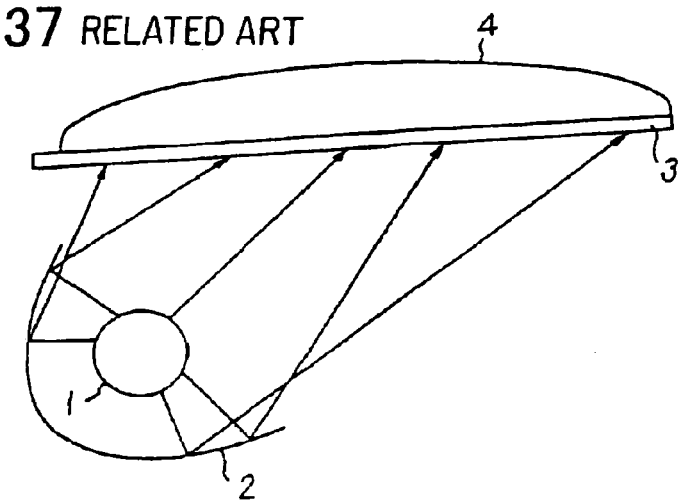
FIG. 37 is a cross-sectional view that depicts a lighting device in which a rod-shaped light source is used.
Figure 38:
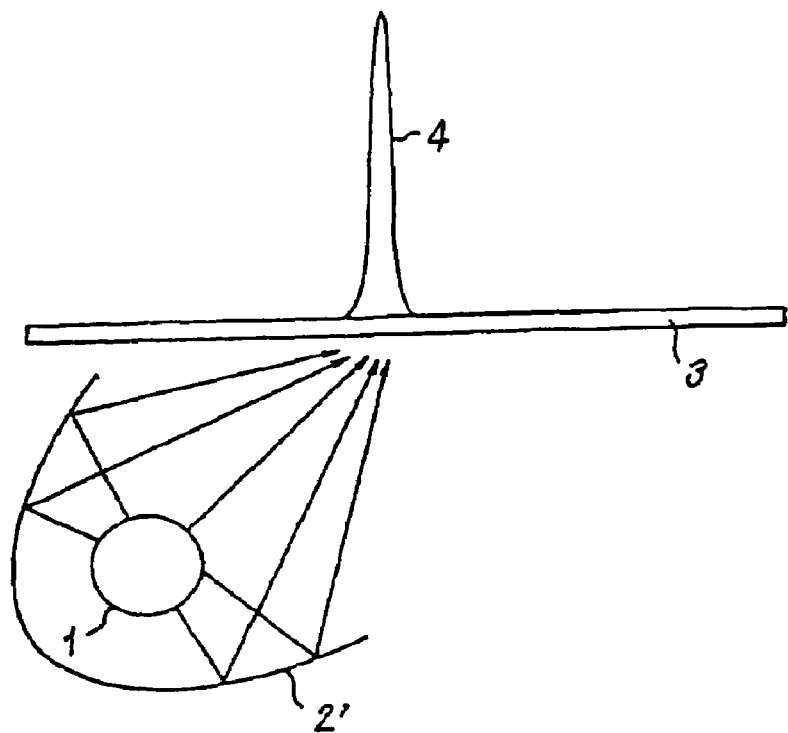
FIG. 38 is a cross-sectional view that depicts a lighting device in which a rod-shaped light source is used.
Figure 39:
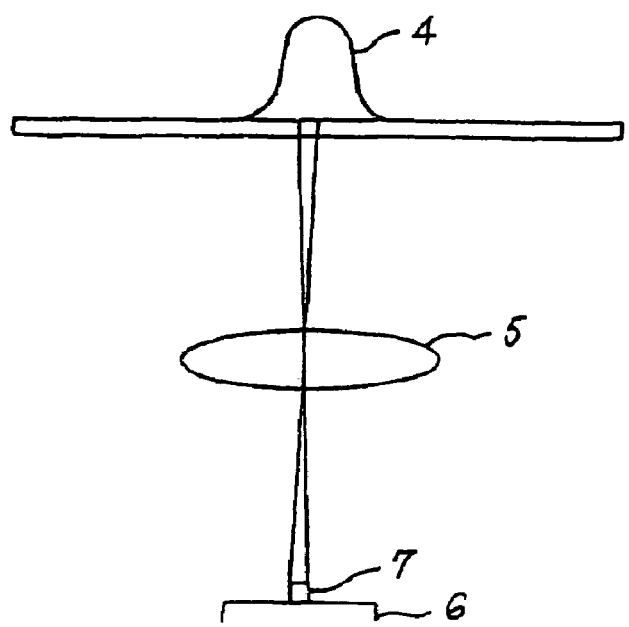
FIG. 39 is a schematic diagram that depicts a positional relationship of light-receiving elements in a digital copying machine and an image scanner.
Figure 40A:
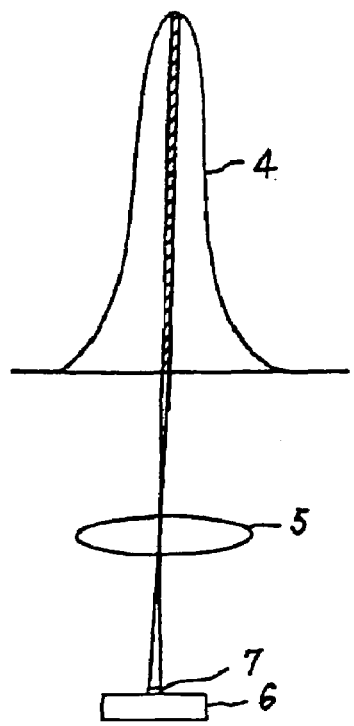
FIGS. 40A to 40D are drawings that depict a relationship between a change in the luminance distribution curve and the reading position.
Figure 40B:
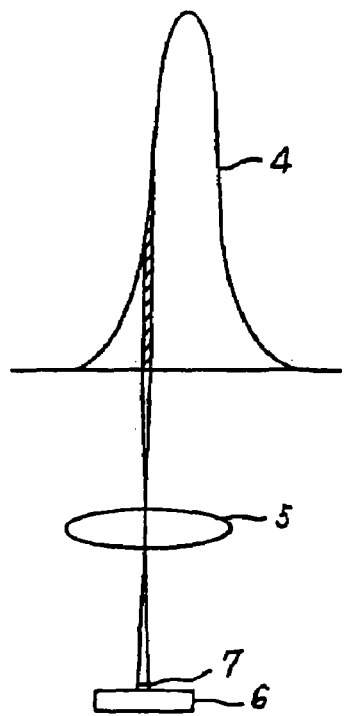
Figure 40C:
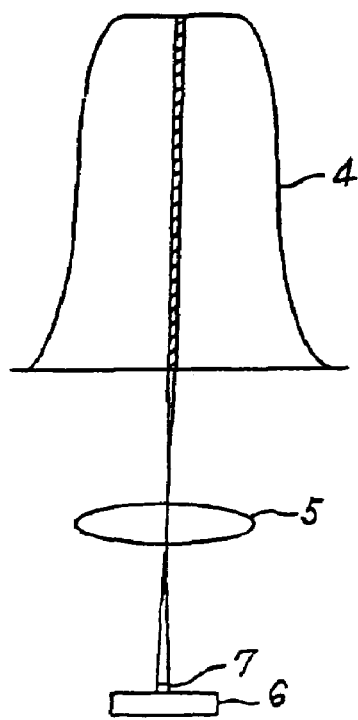
Figure 40D:
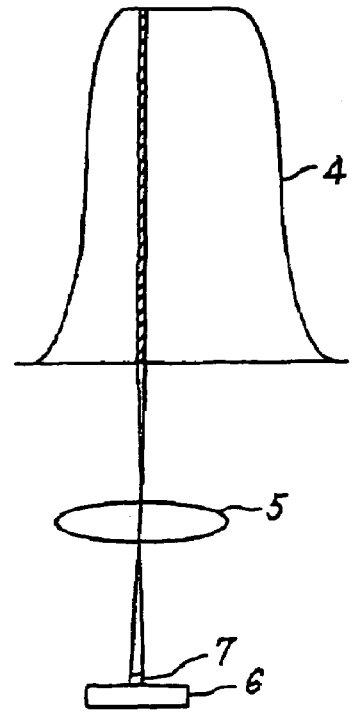

The difference in shapes of distributions as previously shown by FIGS. 37 and 38 can be recognized to a certain degree based on differences in the half-value width. The half-value width refers to a width in the axis of abscissas in a range that exhibits values equal to or not less than ½ of the maximum value. In the example of FIG. 11C, the half-value width corresponds to about 11.7 millimeters on curve G0. The smaller the value, the steeper the peak portion becomes in the curve. Hereinafter, since the half-value width is merely a reference value, only the values in association with curve G0 are shown.

Concrete embodiments (examples) of the present invention will be explained below.

The objectives of the present invention are to utilize LED light with high efficiency, and also to form a luminance flat portion having a width of equal to or not less than a predetermined value in illumination portion. However, the production tolerance of the lighting optical system of the present invention requires a tolerance several times greater than the production tolerance of photographic lenses, although the number of parts is smaller so that the target tolerance is easily achieved. Therefore, it is necessary to form a luminance flat portion with equal to or not less than predetermined luminance having a width of equal to or not less than a predetermined value at a predetermined position, even when the relative positional relationship between the LED and the optical element fluctuates by an amount several times greater than the production tolerance of the photographic lens.

Therefore, the present invention first provides a lighting device in which the light utilization efficiency and the luminance flat portion range are exemplarily designed. Further, the present invention obtains a lighting device in which the incident light diffusing function of the optical element is intentionally increased by a predetermined amount in comparison with the structure of the exemplarily designed lighting device. By increasing the incident light diffusing function by a predetermined amount, it becomes possible to further reduce luminance irregularities due to errors in the light incident position, although the light utilization efficiency is lowered.

The lighting device of the present invention makes it possible to provide a bright, virtually constant luminance distribution on an illumination face, and when used in an image-reading device, in particular, in a color-image reading device, it provides a system that is free from degradation in color balance even when there are mechanical production errors and the like.

According to the lighting device of the present invention, it becomes possible to reduce problems, such as disturbance in a luminance distribution curve and deviations in a lighting position, due to errors in installation positional relationship between LED elements and optical elements, to a level that causes no problems in practical use.

Figure 12A:
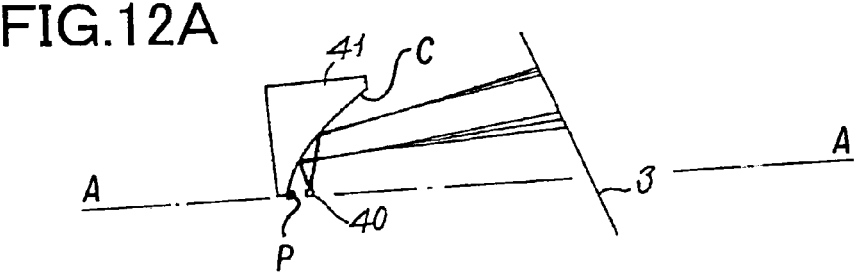
FIGS. 12A to 12C are drawings that explain a lighting device of a first example.
Figure 12B:
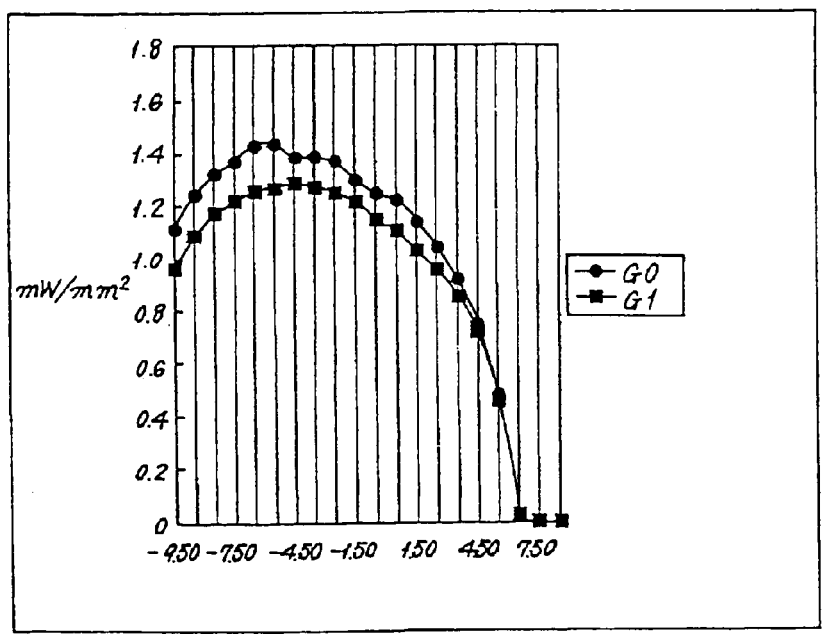
Figure 12C:
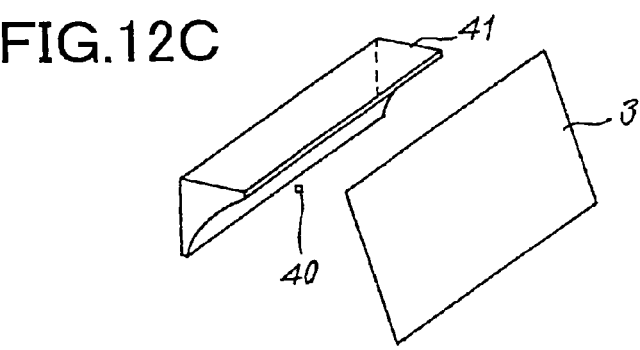

FIGS. 12A to 12C are for explaining a lighting device according to a first example of the present invention. Precisely, FIG. 12A is a light-ray drawing; FIG. 12B is a luminance distribution curve of an illumination face; and FIG. 12C is a perspective view of the lighting device. The reference numeral 40 represents a light-emitting element serving as a light source, and reference numeral 41 represents a reflecting mirror.

In all the following the first example to a ninth example, a partially cylinder-shaped concave-face mirror, which has a cross section shaped into a quadratic curve, is used with its symmetric axis being horizontally placed, and only the upper half portion from the symmetric axis is used as a reflecting mirror. Here, depending on positions at which the light-emitting element is placed, within a range in which effective light rays reach the illumination face via the reflecting mirror, a portion slightly below the symmetric axis near the apex of the quadratic curve may be used as the reflecting mirror.

In the case of the concave-face reflecting mirror, although the light-ray incident opening is not provided with a clear opening section; the light-ray transmission permissible area of a virtual face containing a straight line connecting the end of the reflecting mirror near the apex P and the light-ray releasing face of the light-emitting element is defined as the light-ray incident opening. In the same manner, with respect to the light-ray releasing opening, the light-ray transmission permissible area of a virtual plane that passes through the end of the reflecting mirror on the side farther from the apex P, and is in parallel with the Y-axis is defined as the light-ray releasing opening.

Here, it is supposed that the rightward horizontal direction is the X-axis positive direction and that the upward direction is the Y-axis positive direction. With respect to the light-emitting element, a square facial light-emitting element with one side of its light-ray releasing face being set to "a" (millimeter) is used, and the light-ray releasing face is placed on a horizontal face so that the center light ray is released in the Y-axis positive direction. With respect to the position in the X-axis direction, supposing that the focal point position is 0, it is indicated by the center position x (millimeter) on the light-ray releasing face. With respect to the position in the Y-axis direction, supposing that the position of the symmetric axis is 0, it is indicated by the position y (millimeter) on the light-ray releasing face. For convenience of calculation, it is supposed that the output of the light-emitting element is 1 watt.

The specifications of the quadratic curve C are indicated by the curvature radius R (millimeter) and the cone constant K. Depending on ranges of its value, the cone constant K indicates an ellipse, a parabolic line and hyperbolic lines in a separate manner. Ellipse: $-1<K<0$, Parabolic line: $K=-1$, Hyperbolic lines: $K<-1$ The illumination face (document face) is placed not perpendicularly to the symmetric axis A, but with a certain angle θ. Since an image-reading element is placed in a direction perpendicular to the illumination face, this arrangement is made so as not to block its light rays. Here, since the distance from the light-source unit to the document face also forms one of factors that cause fluctuations in the luminance distribution, the coordinate at the x segment of the document face is indicated as a reference value L (millimeter).

Specifications in the first example are as follows:

| | |
|---|---|
| Reflecting mirror cross section | hyperbolic line |
| | $R = 4.0; K = -1.30$ |
| Light source size | $a = 0.4$ (small) |
| Light source position | $x = 0, y = 0.3$ |
| Document face position | $L = 26$ (small) |
| Document face angle | $\theta = 20$ degrees |

Upon calculations to follow light rays, it is supposed that each of the light-emitting points of the light source has a luminous intensity distribution (spherical shape when viewed three-dimensionally) with a circular cross section as shown in FIG. 1. Although light rays, released from the light-emitting point toward the second quadrant, are all allowed to reach the reflecting mirror, light rays, released toward the first quadrant sometimes reach the reflecting mirror at considerably farther positions. Since it is not possible to make a reflecting mirror with a large size from the viewpoint of manufacturing costs, the size of the reflecting mirror is sometimes preferentially determined at the sacrifice of the quantity of light. The height of the reflecting mirror from the light axis, that is, the y-coordinate is indicated as a reference value H. In the first example, H=18.

The layout position of the light-emitting element is placed near the focal point position; however, this is not necessarily limited to the focal point position. As indicated by the present example, the layout position may be shifted in any of positive and negative directions with respect to the X and Y directions. Here, the amount of shift is preferably set to a value that is not greater than "a" that corresponds to the size of the light-emitting element. When the shift from the focal point becomes too large, deviations in light rays become too large, causing wastefulness in the quantity of light.

The luminance distribution curve shown in FIG. 12B forms a moderate curve, and at the first glance, it seems that there is no flat portion; however, when viewed in a range from the greatest value to the value of 12% smaller than the greatest value in the peripheral portion including the greatest value, the flat portion is present with a width of about 8.3 millimeters on curve G0 and with a width of about 9 millimeters on curve G1. Hereinafter, the width obtained from this viewpoint is referred to as a width of the flat portion. In place near the center of the width of the flat portion, a width of 3 millimeters in the vicinity including the greatest value is specified from the viewpoint of easiness for positional determination, and the rate of change is observed; thus, the rate of change is about 4.1% on curve G0, which is greater than that on curve G1 of about 2.8%. The width of 3 millimeters including the greatest value is referred to as a reading set area.

Consequently, the light source having this arrangement is of course applicable to monochrome-image-use devices, and is also applicable to color-image-use devices sufficiently. The half-value width was not measurable since no half value was available from the left side of the figure.

Upon defining the flat portion, the value of 12% is used; however, this value is determined based on color-image-use data requiring severer conditions, and upon designing a monochrome-image-use device, the numeric value of 30% may be used.

Figure 13A:
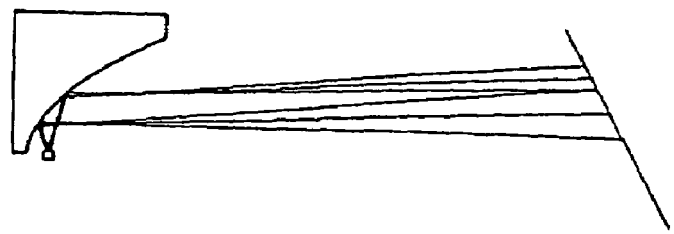
FIGS. 13A and 13B are drawings that explain a lighting device of a second example.
Figure 13B:
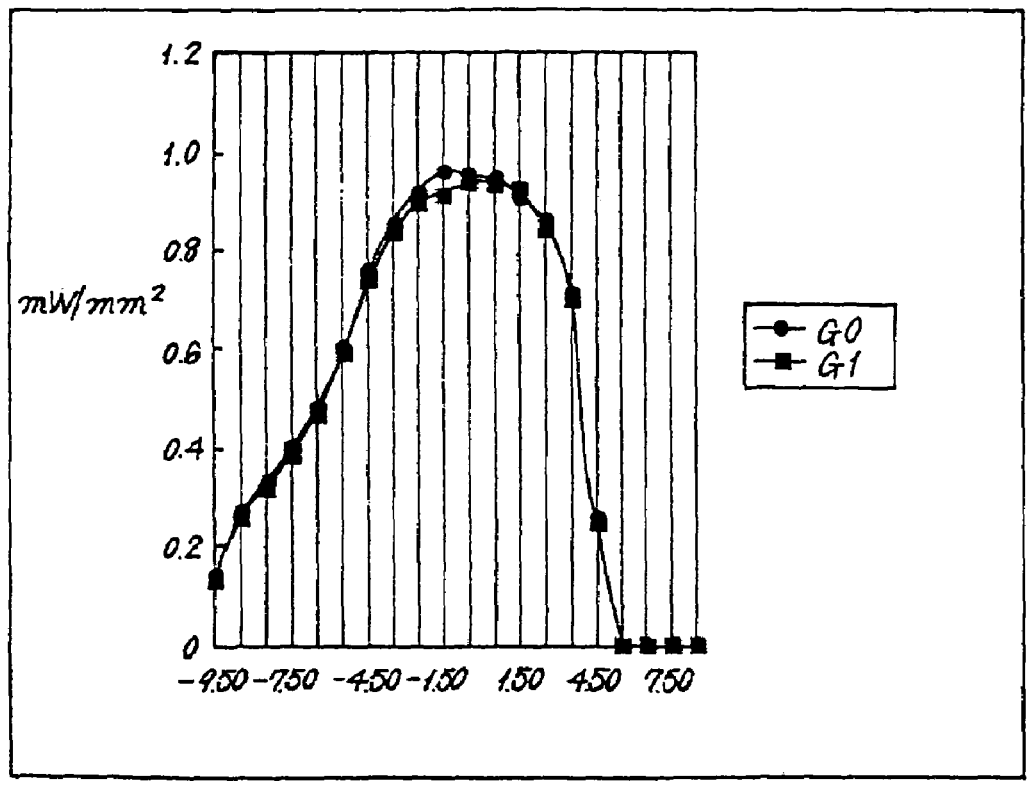

FIGS. 13A and 13B are drawings that explain a lighting device according to a second example. Precisely, FIG. 13A is a light-ray drawing and FIG. 13B is a drawing that depicts a luminance distribution curve of an illumination face. FIG. 13A is same as any of FIGS. 14A, 15A, 16A, 17A, 18A, 19A, and 20A, and FIG. 13B is same as any of FIGS. 14B, 15B, 16B, 17B, 18B, 19B, and 20B, however, the scales of the longitudinal axis in FIGS. 14B, 15B, 16B, 17B, 18B, 19B, and 20B are changed to correspond to the small, middle and large sizes of L.

Here, up to explanations of a ninth example, the descriptions of the light source and reflective mirror are omitted together with their reference numerals.

Specifications in the second example are as follows:

| Reflecting mirror cross section | hyperbolic line |
| --- | --- |
| | R = 4.0; K = −1.05; H = 20 |
| Light source size | a = 0.4 (small) |
| Light source position | x = 0, y = 0 |
| Document face position | L = 50 (middle) |
| Document face angle | θ = 28 degrees |

The width of the flat portion is about 6.4 millimeters on G0, and about 6.3 millimeters on G1, and the rate of luminance change in the reading set area is about 4.0% in G0, which is greater than that in G1 of about 2.7%. The half-value width was about 10.4 millimeters.

Figure 14A:
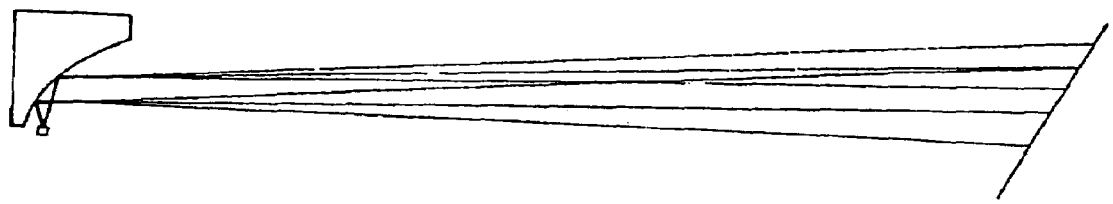
FIGS. 14A and 14B are drawings that explain a lighting device of a third example.
Figure 14B:
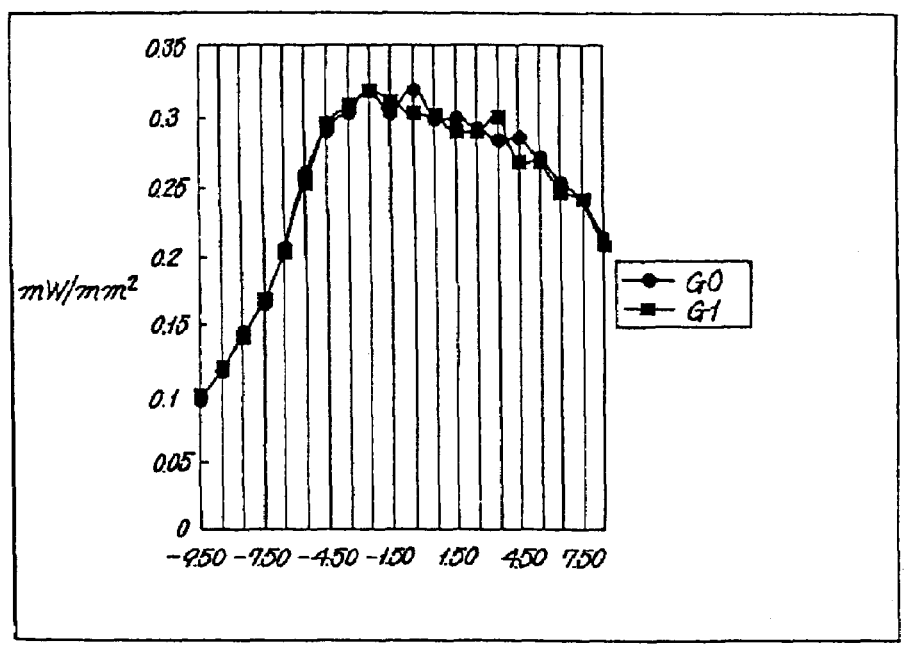

FIGS. 14A and 14B are drawings that explain a lighting device according to a third example.

Specifications in the third example are as follows:

| Reflecting mirror cross section | hyperbolic line |
| --- | --- |
| | R = 4.0; K = −1.07; H = 19 |
| Light source size | a = 0.4(small) |
| Light source position | x = 0, y = 0 |
| Document face position | L = 94(large) |
| Document face angle | θ = −30 degrees |

The width of the flat portion is about 9.9 millimeters on G0, and about 8.1 millimeters on G1, and the rate of luminance change in the reading set area is about 6.5% in G0, and that in G1 is about 8.1%, which is greater. The half-value width was not measurable since no half value was available from the right side of FIG. 14B.

Figure 15A:
FIGS. 15A and 15B are drawings that explain a lighting device of a fourth example.
Figure 15B:
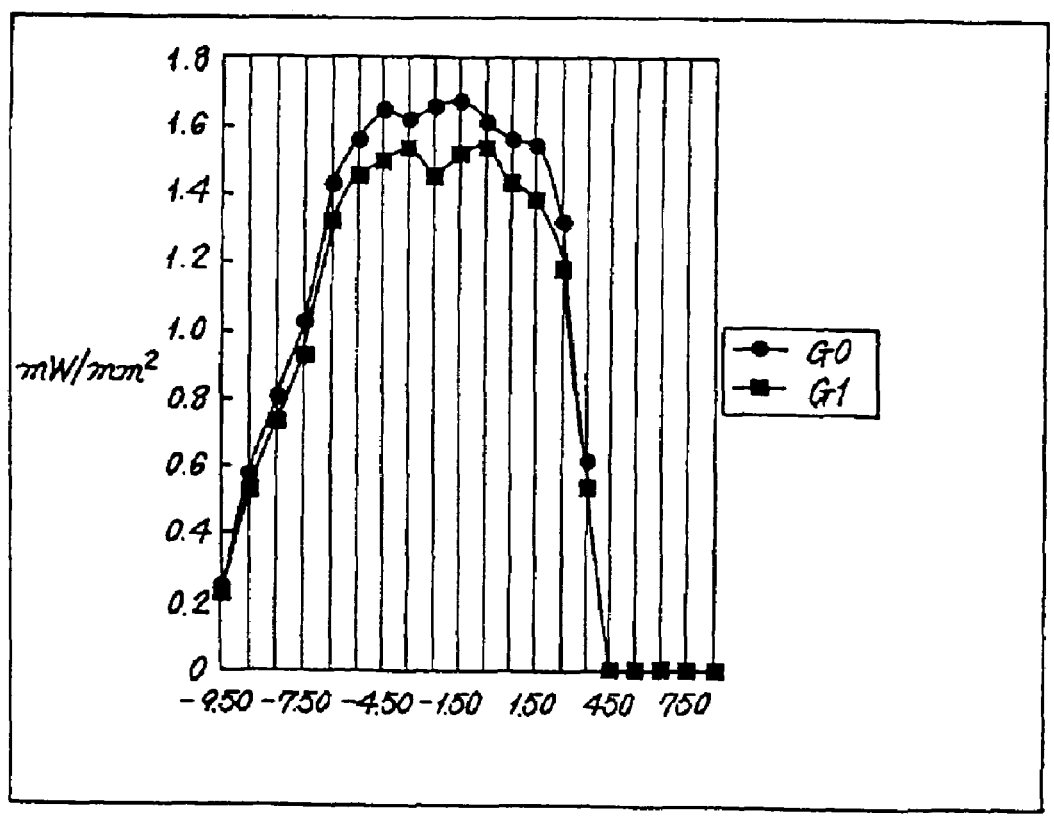

FIGS. 15A and 15B are drawings that explain a lighting device according to a fourth example.

Specifications in the fourth example are as follows:

| Reflecting mirror cross section | hyperbolic line |
| --- | --- |
| | R = 4.0; K = −1.10; H = 18 |
| Light source size | a = 1.0 (middle) |
| Light source position | x = 0, y = 0 |
| Document face position | L = 21(small) |
| Document face angle | θ = −30 degrees |

The width of the flat portion is about 9.1 millimeters on G0, and about 8.0 millimeters on G1, and the rate of luminance change in the reading set area is about 3.4% in G0, and about 5.5% in G1, which is greater. The half-value width is about 11.8 millimeters.

Figure 16A:
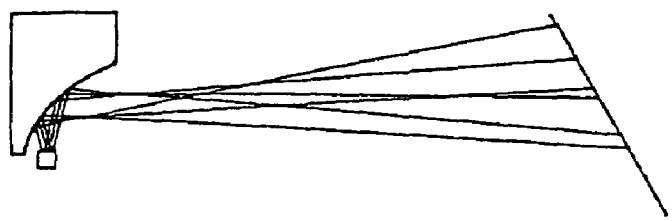
FIGS. 16A and 16B are drawings that explain a lighting device of a fifth example.
Figure 16B:
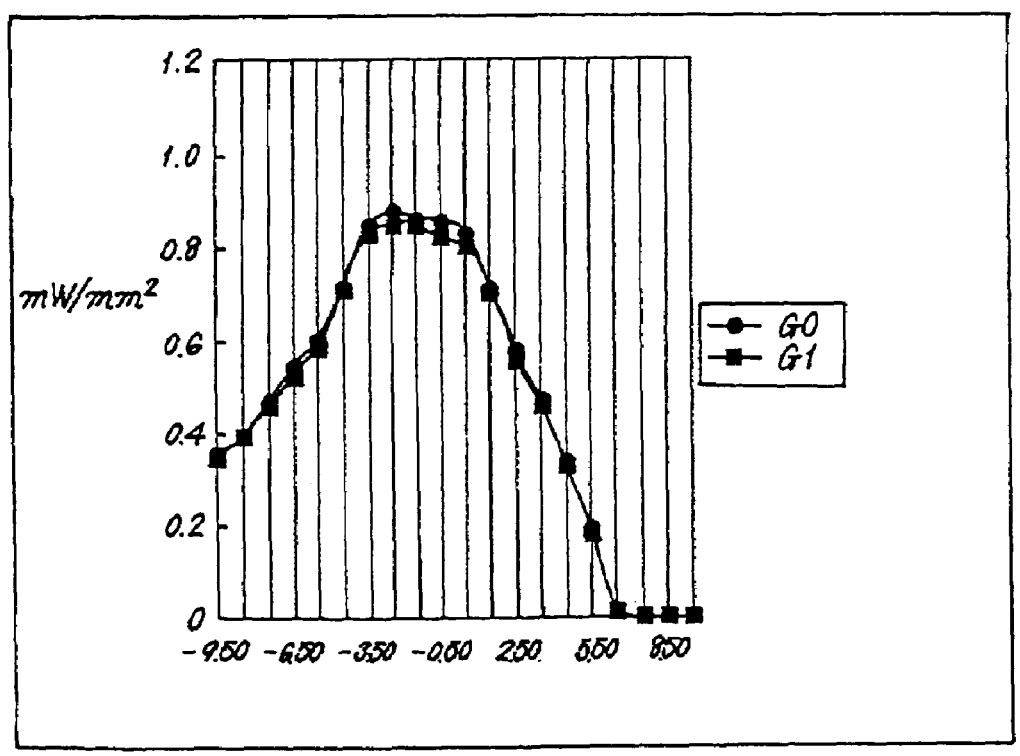

FIGS. 16A and 16B are drawings that explain a lighting device according to a fifth example.

Specifications in the fifth example are as follows:

| Reflecting mirror cross section | ellipse |
| --- | --- |
| | R = 4.08; K = −0.884; H = 15 |
| Light source size | a = 1.0 (middle) |
| Light source position | x = −0.25, y = 0 |
| Document face position | L = 50 (middle) |
| Document face angle | θ = 30 degrees |

The width of the flat portion is about 5.2 millimeters on G0, and about 5.4 millimeters on G1, and the rate of luminance change in the reading set area is about 2.3% in G0, and about 3.3% in G1, which is greater. The half-value width was about 11.7 as described earlier.

Figure 17A:
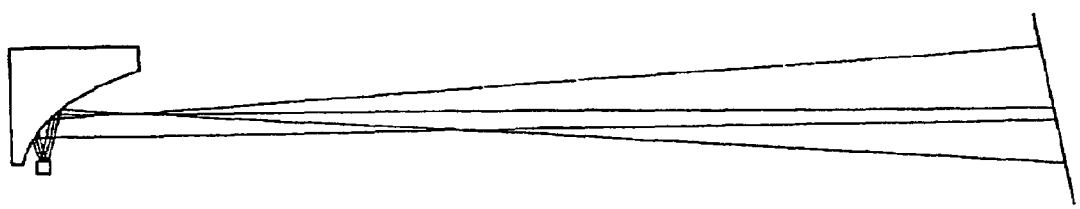
FIGS. 17A and 17B are drawings that explain a lighting device of a sixth example.
Figure 17B:
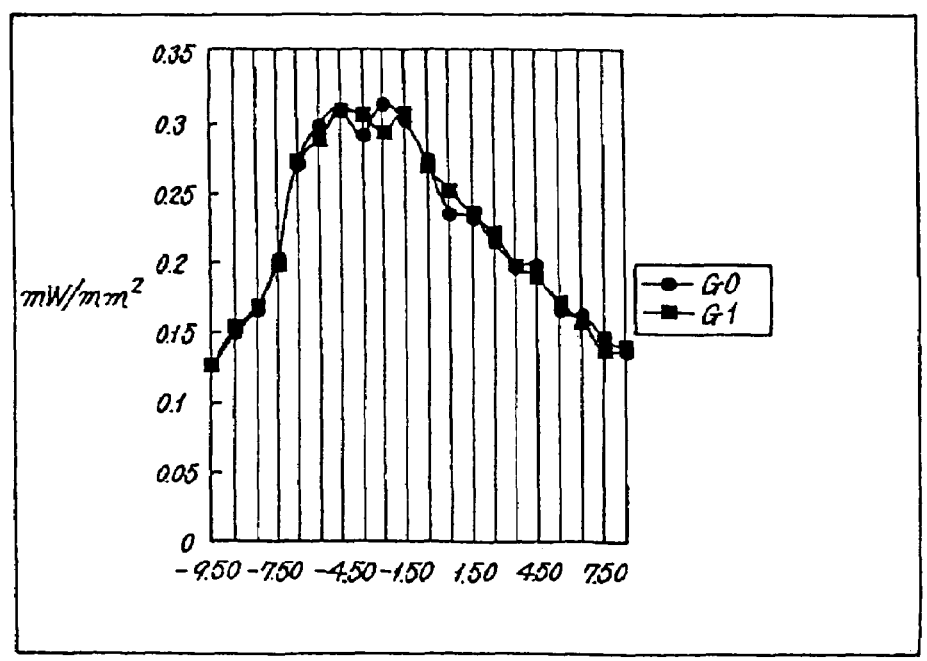

FIGS. 17A and 17B are drawings that explain a lighting device according to a sixth example.

Specifications in the sixth example are as follows:

| Reflecting mirror cross section | ellipse |
| --- | --- |
| | R = 4.08; K = −0.97; H = 19 |
| Light source size | a = 1.0 (middle) |
| Light source position | x = 0, y = 0 |
| Document face position | L = 99 (large) |
| Document face angle | θ = 10 degrees |

The width of the flat portion is about 5.9 millimeters on G0, and about 6.1 millimeters on G1, and the rate of luminance change in the reading set area is about 7.2% in G0, which is greater than that in G1 of about 4.6%. The half-value width was about 15.9 millimeters.

Figure 18A:
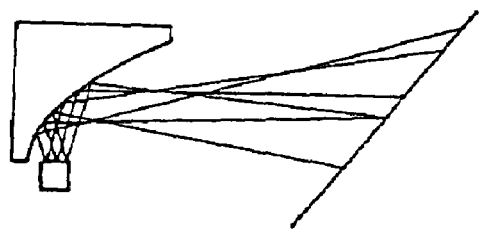
FIGS. 18A and 18B are drawings that explain a lighting device of a seventh example.
Figure 18B:
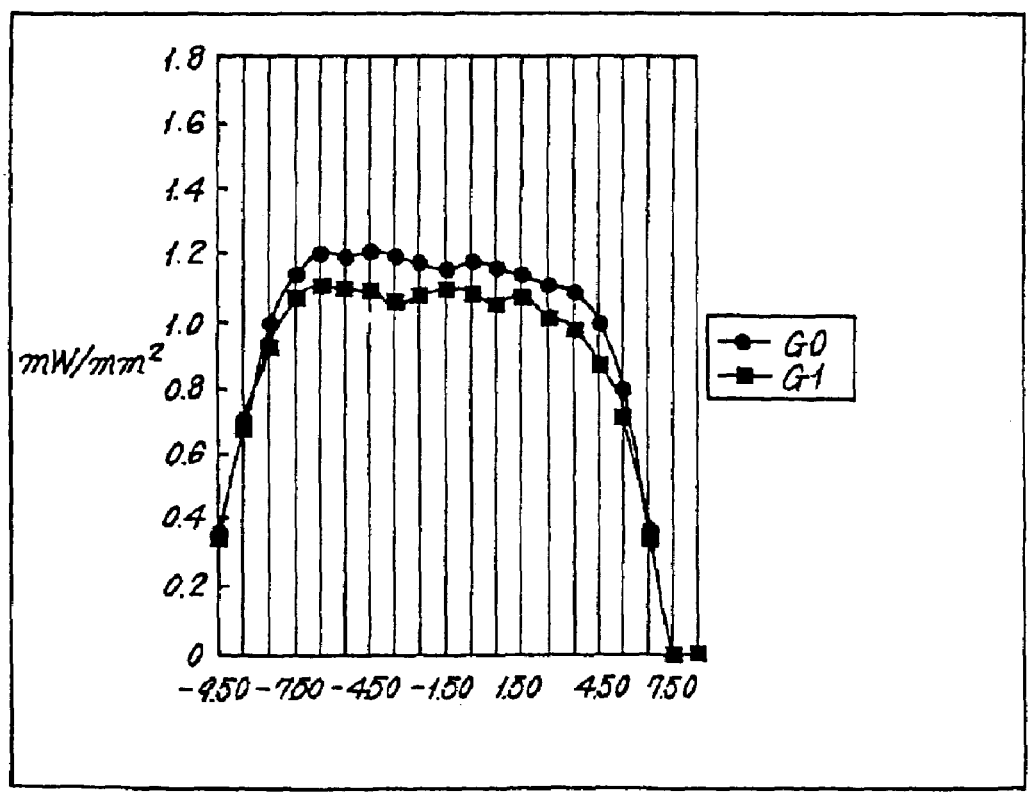

FIGS. 18A and 18B are drawings that explain a lighting device according to a seventh example.

Specifications in the seventh example are as follows:

| Reflecting mirror cross section | ellipse |
| --- | --- |
| | R = 4.08; K = −1.0; H = 18 |
| Light source size | a = 2.0 (large) |
| Light source position | x = 0, y = 0 |
| Document face position | L = 19 (small) |
| Document face angle | θ = −40 degrees |

The width of the flat portion is about 12.9 millimeters on G0, and about 11.6 millimeters on G1, and the rate of luminance change in the reading set area is about 0.6% in G0, and about 3.5% in G1, which is greater. The half-value width was about 15.8.

Figure 19A:
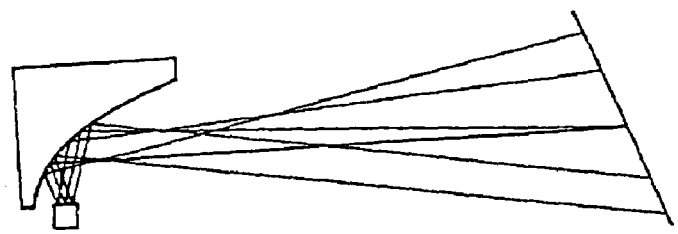
FIGS. 19A and 19B are drawings that explain a lighting device of an eighth example.
Figure 19B:
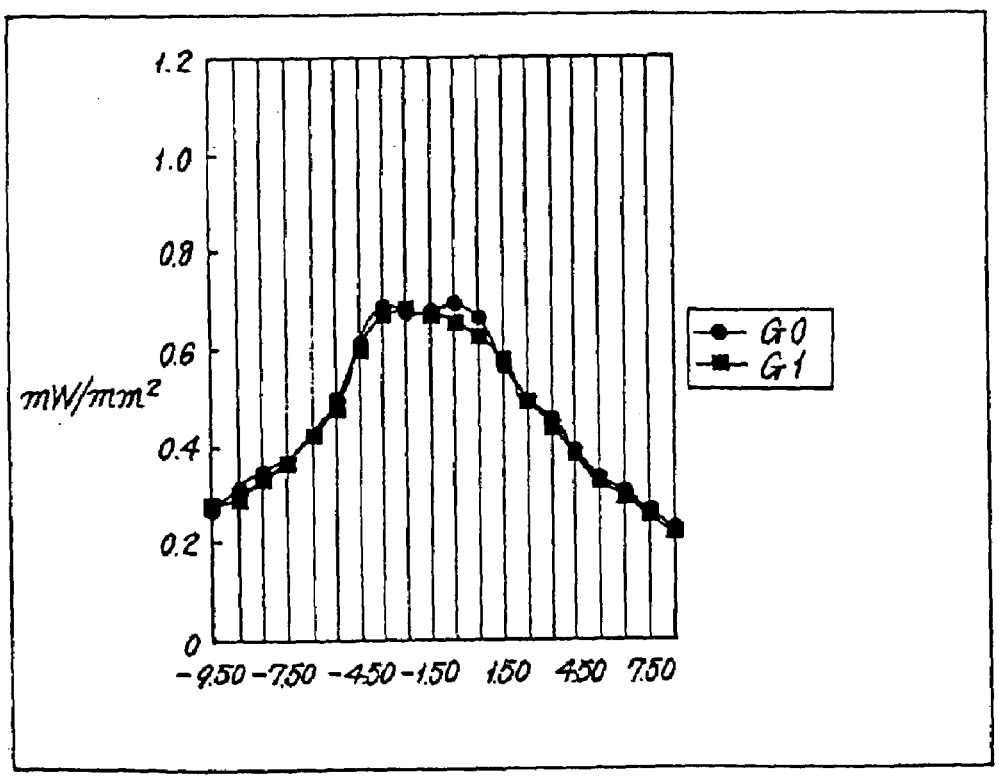

FIGS. 19A and 19B are drawings that explain a lighting device according to an eighth example.

Specifications in the eighth example are as follows:

| Reflecting mirror cross section | ellipse<br>R = 5.0; K = −0.85; H = 20 |
| --- | --- |
| Light source size | a = 2.0 (large) |
| Light source position | x = 0, y = 0 |
| Document face position | L = 49 (middle) |
| Document face angle | θ = 20 degrees |

The width of the flat portion is about 5.5 millimeters on G0, and about 5.6 millimeters on G1, and the rate of luminance change in the reading set area is about 2.5% in G0, and about 3.4% in G1, which is greater. The half-value width was about 13.8.

Figure 20A:
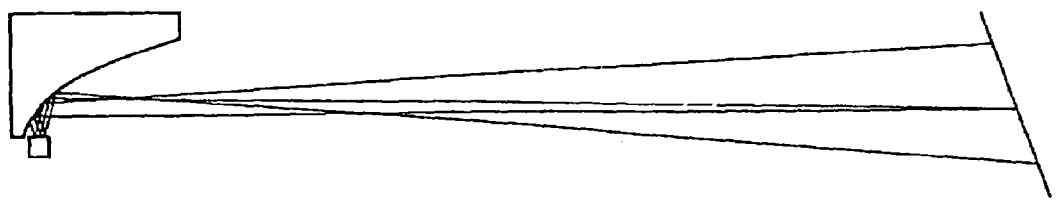
FIGS. 20A and 20B are drawings that explain a lighting device of a ninth example.
Figure 20B:
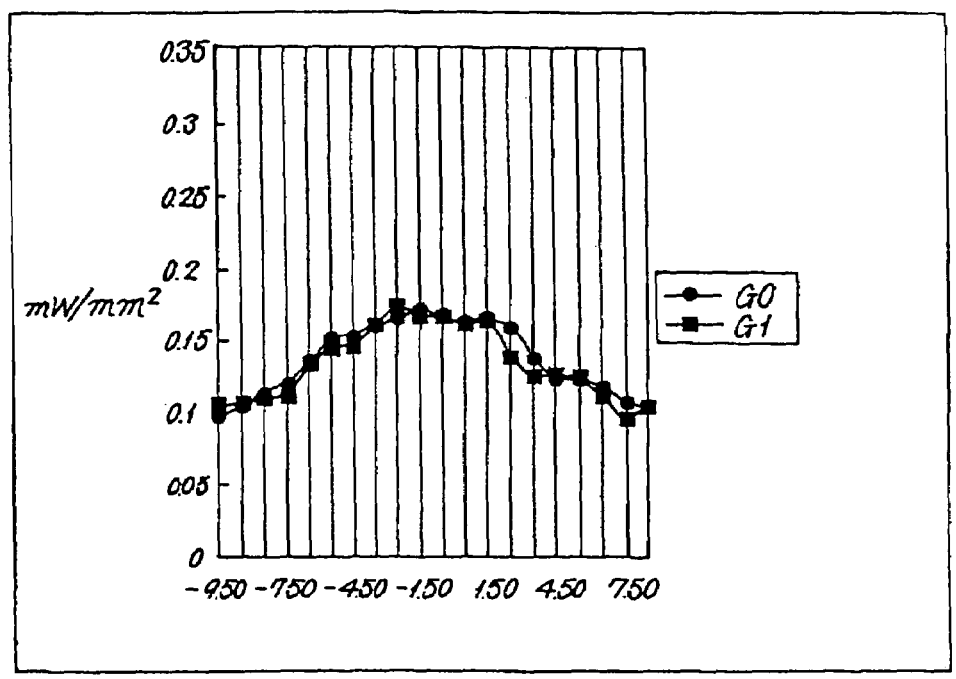

FIGS. 20A and 20B are drawings that explain a lighting device according to a ninth example.

Specifications in the ninth example are as follows:

| Reflecting mirror cross section | hyperbolic line<br>R = 3.5; K = −0.95; H = 20 |
| --- | --- |
| Light source size | a = 2.0 (large) |
| Light source position | x = 0, y = 0 |
| Document face position | L = 99.5 (large) |
| Document face angle | θ = 20 degrees |

The width of the flat portion is about 8.5 millimeters on G0, and about 6.1 millimeters on G1, and the rate of luminance change in the reading set area is about 4.6% in G0, and that in G1 is about 5.9%, which is greater. The half-value width was not measurable since no half value was available from both of the left and right sides of the figure.

Figure 21:
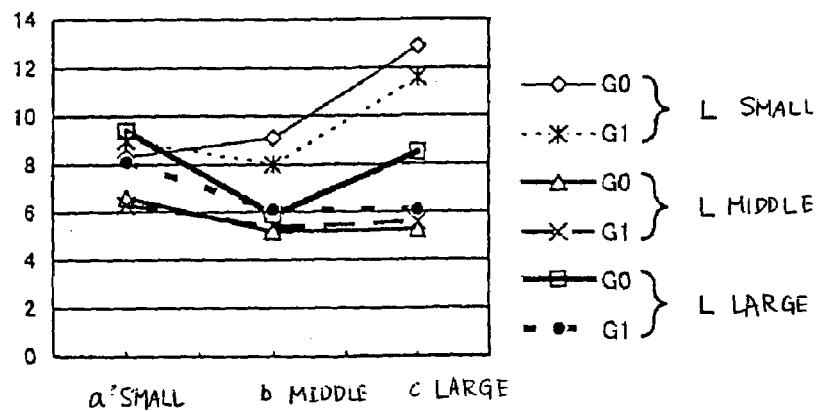
FIG. 21 is a graph in which luminance distribution drawings of the first example to the ninth example are aligned in the order of "small, "middle" and "large"

FIG. 21 is a graph in which widths of the flat portions of the first example to the ninth example are plotted in the order of "small, "middle" and "large" with "a" being indicated by the axis of abscissas.

L and curves G0 and G1 are used as parameters. In the graph, the one-dot chain line represents 3 millimeters that is required as width of the reading set area. When a curve is located above this line, no problems are raised in practical use; therefore, all the examples satisfy the target. From the viewpoint of providing a greater permissible width in mechanical errors, the larger the width of the flat portion, the better. However, since the larger width causes corresponding wastefulness in quantity of light, it can be said that it is not necessary to provide a large width as long as the reading set width is positively maintained. This graph depicts that when "a" is large with L being small, a large flat portion is obtained. In contrast, when L is middle, the quantity of light is effectively utilized, without being affected by the size of "a" so much.

Figure 22:
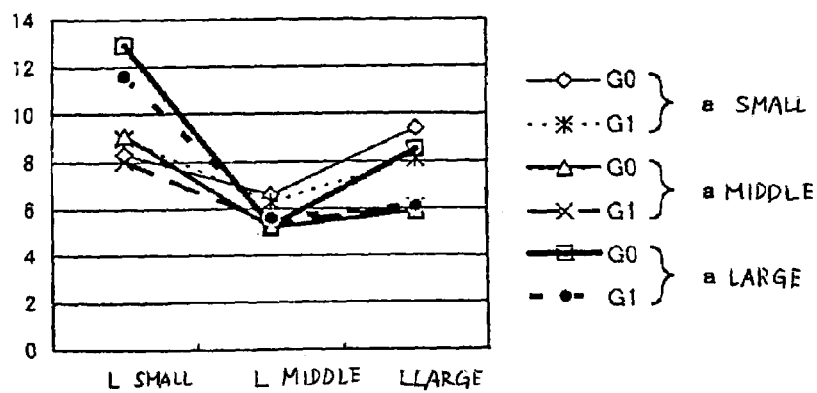
FIG. 22 is a graph in which widths of the flat portions are plotted in the order of "small, "middle" and "large" with "L" being indicated by the axis of abscissas.

FIG. 22 is a graph in which widths of the flat portions are plotted in the order of "small, "middle" and "large" with L being indicated by the axis of abscissas.

This graph depicts that when L is middle, a comparatively constant width of the flat portion is obtained although the size is small.

When L is small, a larger flat portion is obtained although there are slight deviations.

Figure 23:
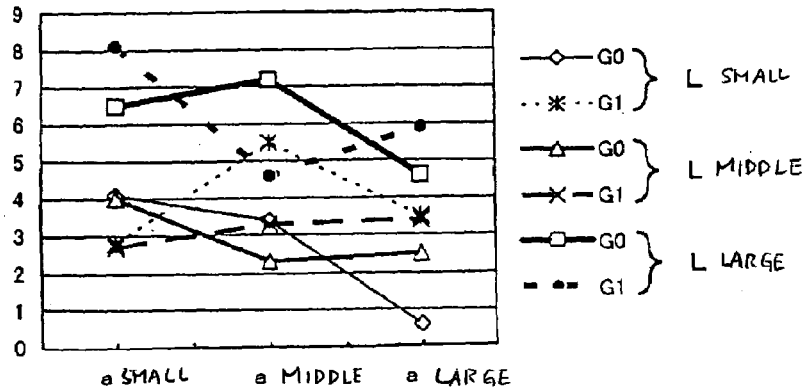
FIG. 23 is a graph in which the rate of luminance change in a reading set area of 3 millimeters is plotted with "a" being indicated by the axis of abscissas.

FIG. 23 is a graph in which the rate of luminance change in the reading set area of 3 millimeters is plotted with "a" being indicated by the axis of abscissas. However, this graph does not indicate any specific trend.

Figure 24:
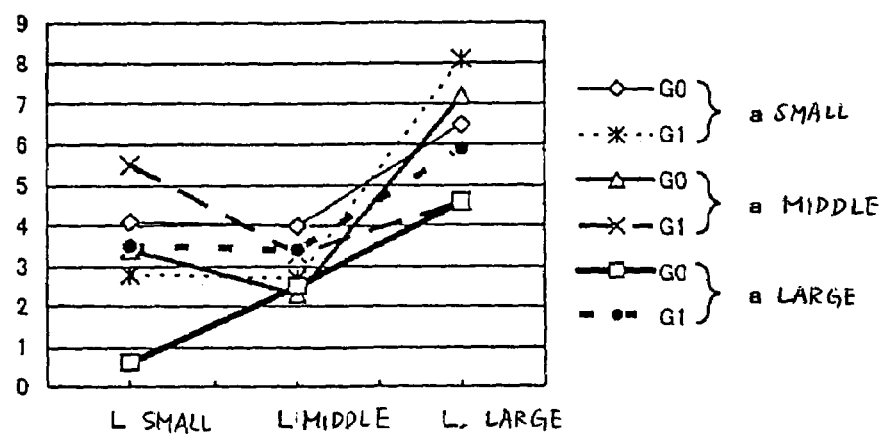
FIG. 24 is a graph in which the rate of luminance change is plotted with L being indicated by the axis of abscissas.

FIG. 24 is a graph in which the rate of luminance change is plotted with L being indicated by the axis of abscissas. Since the rate of luminance change of equal to or not more than 12% causes no problems in practical use, all the examples satisfy the target. Here, the smaller the rate of luminance change, the better; therefore, by setting L to "small" or "middle", the rate is set to virtually equal to or not more than 5%.

Figure 25:
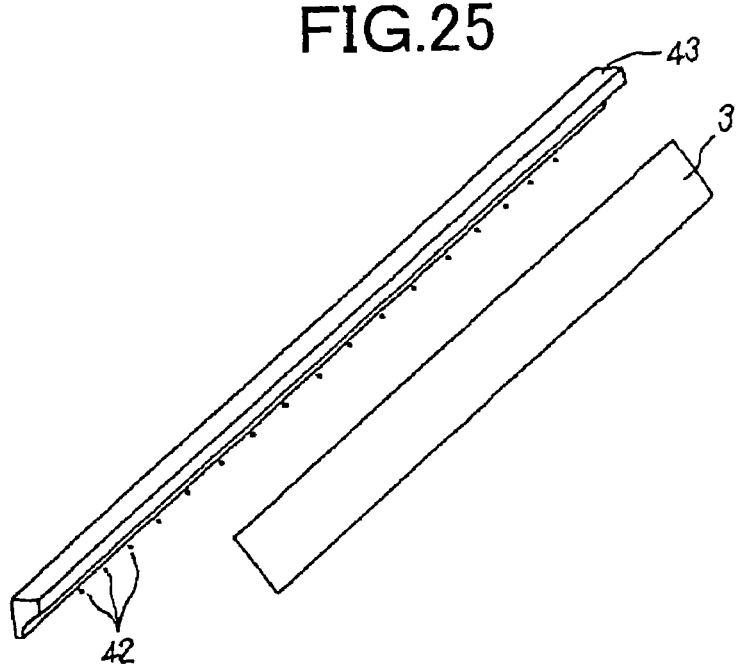
FIG. 25 is a perspective view that depicts one example of a light source device having a plurality of light-emitting elements in the main-scanning direction.

FIG. 25 is a perspective view one of an example of a light source device having a plurality of light-emitting elements in the main-scanning direction. The reference numeral 42 represents a light-emitting element and 43 represents a reflecting mirror.

The present example has basically the same structure as that of the fifth example. The length of a document face 3 in the main-scanning direction is set to 300 millimeters, and the effective length of the reflecting mirror 43 is set to 400 millimeters, that is, longer than the length of a document face 3 in the main-scanning direction.

The light-emitting elements the total number of which is 17 are arranged with regular intervals of 20 millimeters. Therefore, the center interval between the light-emitting elements on the two ends is 320 millimeters, the length between the two ends of the light-emitting elements is 322 millimeters, which is longer than the length of the illumination face.

Figure 26A:
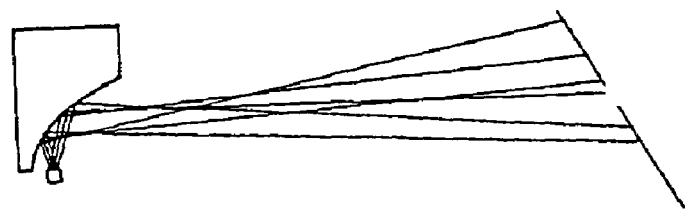
FIGS. 26A and 26B are drawings that depict a luminance distribution in the sub-scanning direction according to a tenth example.
Figure 26B:
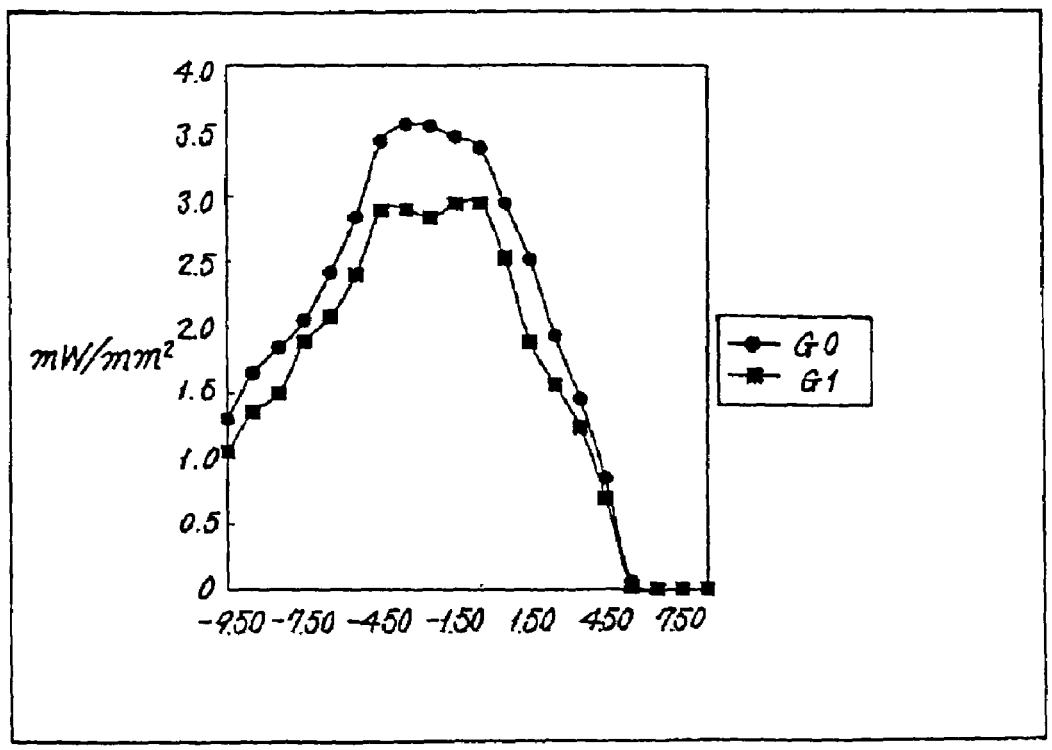

FIGS. 26A and 26B are drawings that depict a luminance distribution in the sub-scanning direction according to the present example. The luminance distribution G1 near each of the ends becomes slightly low. This is because, since the light-emitting elements near the ends virtually correspond to the length of the illumination face, those elements near the ends depend on illumination from one direction.

Figure 27:
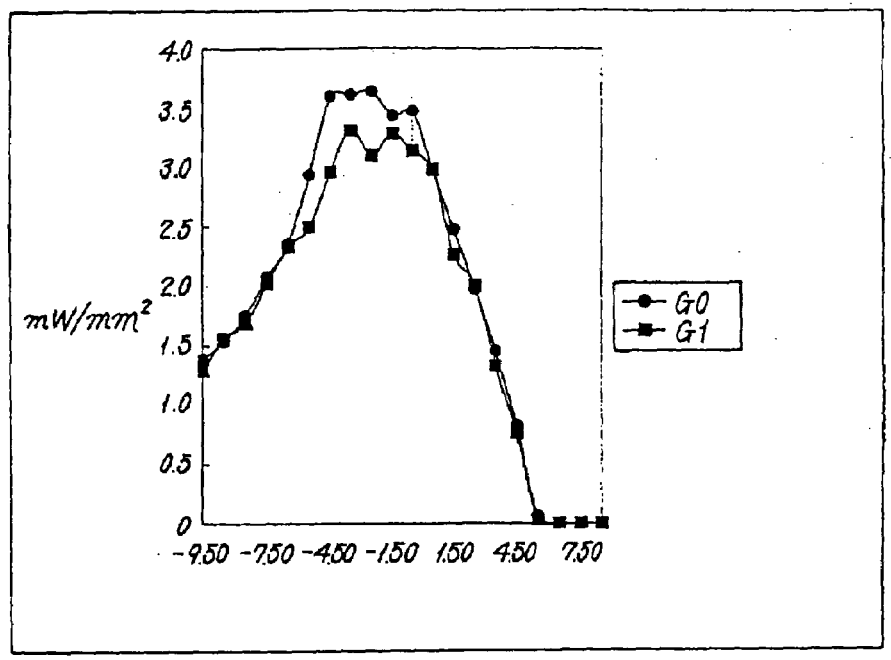
FIG. 27 is a drawing that depicts a luminance distribution in the sub-scanning direction according to an eleventh example.

FIG. 27 is a drawing that depicts a luminance distribution in the sub-scanning direction according to an eleventh example. The eleventh example has virtually the same structure as the tenth example except that two more light-emitting elements are added thereto. In other words, one light-emitting element is placed on the outside of each of the ends of 17 light-emitting elements with a distance of 20 millimeters. Thus, the center-to-center distance between the two ends of the light-emitting elements is 360 millimeters. With this arrangement, the ends of the illumination face are allowed to also receive illumination from the light-emitting elements located on the outsides of 60 millimeters; therefore, it is possible to considerably improve a reduction in luminance on luminance distribution curve G1.

Figure 28:
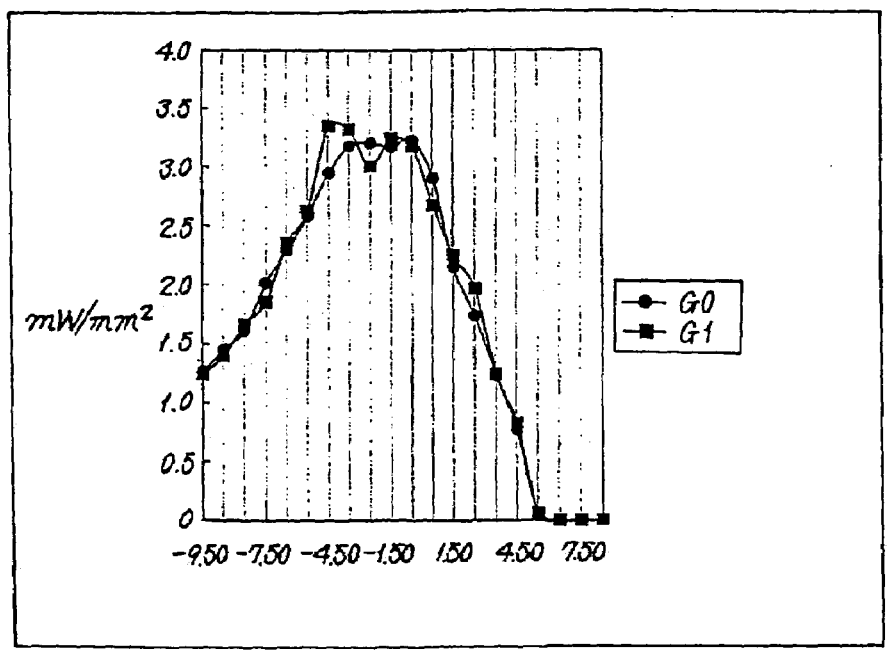
FIG. 28 is a drawing that depicts a luminance distribution in the sub-scanning direction according to a twelfth example.

FIG. 28 is a drawing that depicts a luminance distribution in the sub-scanning direction according to a twelfth example. In the twelfth example, 17 light-emitting elements are arranged with partially uneven intervals. More specifically, even intervals of 22 millimeters are maintained from the central light-emitting element to the fourth element toward each end, and on the outer side from this, each interval is successively narrowed by 1.5 millimeters. Therefore, the distance between the outermost element (8-th element) and the light-emitting element adjacent inside thereof is 16 millimeters, with the center-to-center distance between the light-emitting elements on the outermost sides being set to 322 millimeters, which is longer than the length of the illumination face.

In the eleventh example, since the layout length of the light-emitting elements and the length of the reflecting mirror become too long in comparison with the illumination face, this structure opposes the current trend of miniaturization. In the present example, as indicated by luminance distribution curve G1, even near the ends of the illumination face, the luminance is not so different from that near the center portion, and the layout length of the light-emitting elements and the length of the reflecting mirror are not so different from those in the tenth example.

Figure 29A:
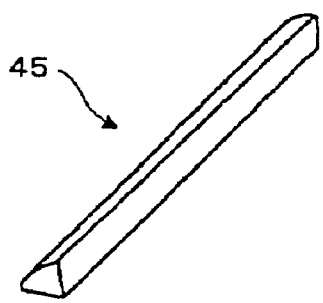
FIGS. 29A to 29C are drawings that depict an optical element to be used in a thirteenth example.
Figure 29B:
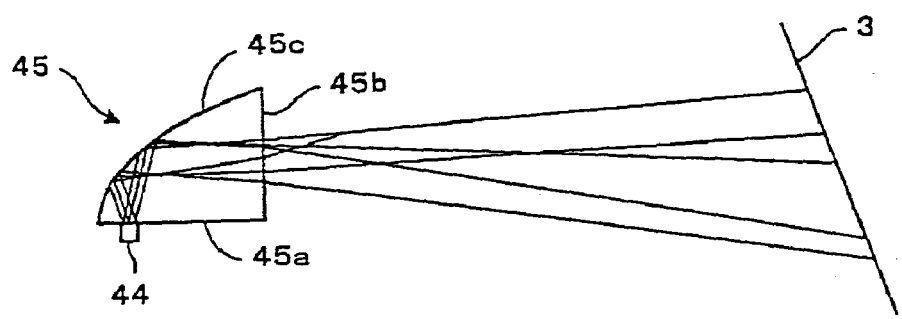
Figure 29C:
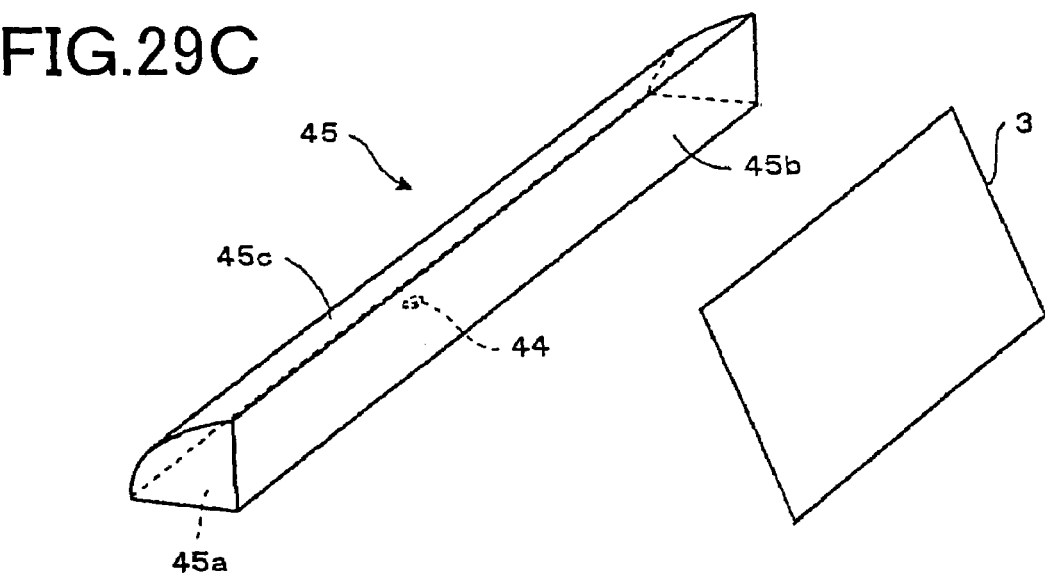

FIGS. 29A to 29C are drawings that depict optical elements to be used in a thirteenth example. FIG. 29A is a side view, FIG. 29B is a perspective view and FIG. 29C is a layout diagram. The reference numeral 44 represents a light-emitting element, 45 represents a partially cylinder-shaped member made of a transparent member made from synthetic resin or glass, which serves as an optical element. Referring to FIG. 29A, a flat-face portion 45a serving as a light-ray incident face and a flat-face portion 45b serving as a light-ray releasing face are orthogonal to each other at respective ends thereof, and each of the other ends is connected by a curve 45c (quadratic curved face when the length direction thereof is taken into consideration) that serves as a concave-face reflecting portion. In general, this curve is a portion of a quadratic curve, and the flat-face portion 45a is formed in a manner to coincide with the symmetric axis of the quadratic curve, or virtually in parallel with the symmetric axis. When problems with heat are solved, the light-ray releasing face of the light-emitting element 44 may be placed in contact with the flat-face portion 45a, and it is made in contact therewith in the present example.

In this arrangement, light rays, released from the light-emitting element 44, are inner-face reflected by the concave-face reflecting portion 45c, and directed to the illumination face 3 after having released from the light-ray releasing face 45b.

Specifications in the present example are as follows:

| Reflecting mirror cross section | ellipse |
|---|---|
| | R = 4.0; K = −0.875; H = 17 |
| Light source size | a = 1.0 |
| Light source position | x = 0, y = 0 |
| Document face position | L = 44.3 |
| Document face angle | θ = 20 degrees |
| Refractive index | 1.5168 |
| Abbe number | 64.2 |

Figure 30:
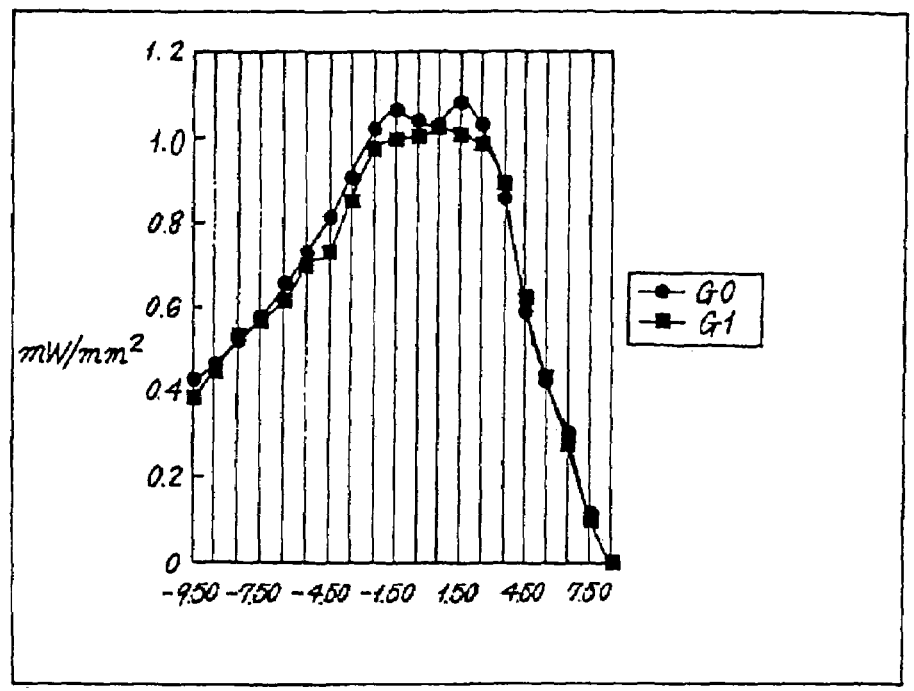
FIG. 30 is a drawing that depicts a luminance distribution in the sub-scanning direction according to the thirteenth example.

FIG. 30 is a graph that depicts a luminance distribution in the sub-scanning direction according to the thirteenth example.

The width of the flat portion is about 12.4 millimeters on G0, and about 13.1 millimeters on G1, and the rate of luminance change in the reading set area is about 4.8% in G0, and that in G1 is about 5.6%, which is greater.

Figure 31:
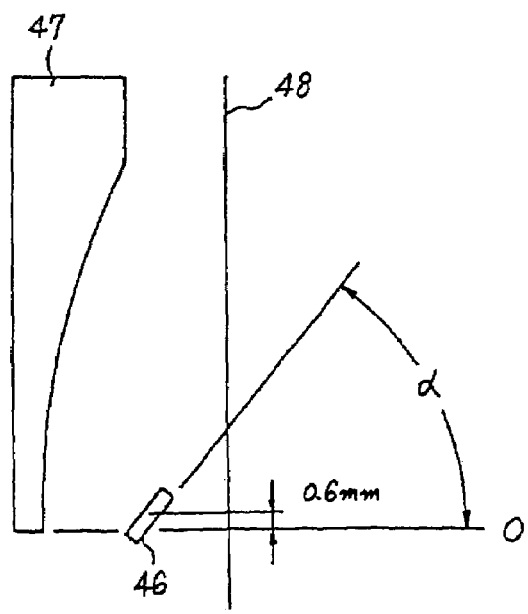
FIG. 31 is a side cross-sectional view that depicts a structure of a fourteenth example.

FIG. 31 is a side view that depicts a structure of a fourteenth example. The reference numeral 46 represents a light-emitting element, 47 represents a reflecting mirror, 48 represents an illumination face and α represents an angle made by the light-emitting element with respect to the light axis.

The fourteenth example provides a structure that achieves high illumination-face luminance by using a single light-emitting element. Although not particularly described with respect to the angle of the light-ray releasing face in the first example to the thirteenth example, it is supposed to be in parallel with the X axis in all the examples. However, it has been known that from the viewpoint of effective utilization of light rays, the light-ray releasing face is preferably tilted to a certain degree.

Specifications in the fourteenth example are as follows:

| Reflecting mirror cross section | circle |
|---|---|
| | R = 30; K = 0; H = 25 |
| Light source size | a = 2.0 |
| Light source position | x = 0, y = 0.6 |
| Light-ray releasing face angle | α = 50 degrees |
| Document face position | L = 2.8 |
| Document face angle | θ = 0 degrees |

Figure 32:
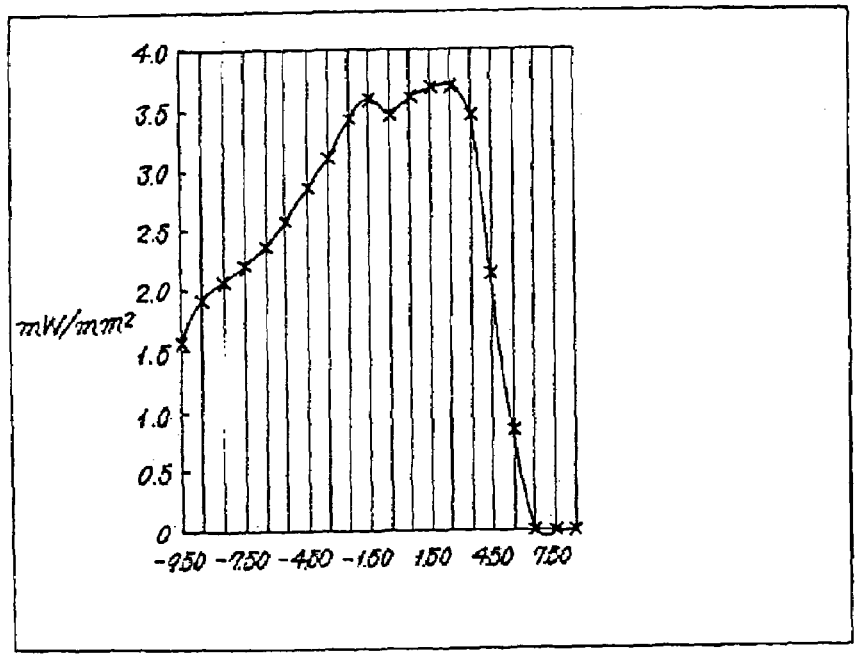
FIG. 32 is a drawing that depicts a luminance distribution in the sub-scanning direction according to the fourteenth example.

FIG. 32 is a graph that depicts a luminance distribution in the sub-scanning direction according to the fourteenth example. With respect to the luminance, a value in the same level as the case using a plurality of light-emitting elements is obtained, and the width of about 6.6 millimeters in the flat portion and the rate of luminance change of about 7% in the reading set area indicate that the present example in not inferior to the tenth example to the twelfth example; however, since it is not possible to ensure an image-reading-use light path due to its inherent structure, this structure is used for limited applications such as displays.

Tilting the light-ray releasing face with respect to the light axis is important in an attempt to make the maximum -energy incident on the effective range of the reflecting mirror. It is most efficient to utilize light rays symmetrically centered on the maximum value of the luminous intensity distribution curve. Preferably, the size of the reflecting mirror is determined to receive all the light rays within the half-value angle.

Figure 33:
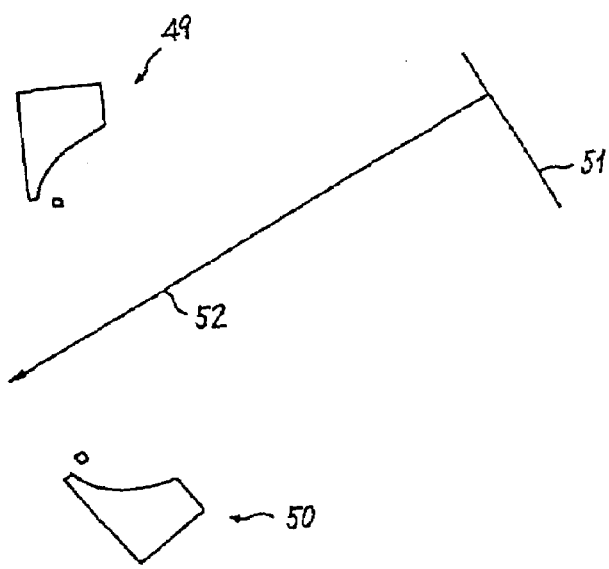
FIG. 33 is a drawing that explains a structure of a fifteenth example.

FIG. 33 is a drawing that explains the structure of a fifteenth example. The reference numeral 49 represents a first light source unit, 50 represents a second light source unit, 51 represents an illumination face, and 52 represents an arrow that indicates a direction in which the light-receiving element is placed.

The first light-source unit 49 in the fifth example is used. The second light-source unit 50 has a structure that is similar to an up-side-down structure with respect to the first light-source unit, and specifications in the fifteenth example are as follows:

| Reflecting mirror cross section | ellipse |
|---|---|
| | R = 4.0; K = 0.88; H = 15 |
| Light source size | a = 1.0 |
| Light source position | x = 0, y = 0 |
| Document face position | L = 57 |
| Document face angle | θ = 10 degrees |

Figure 34:
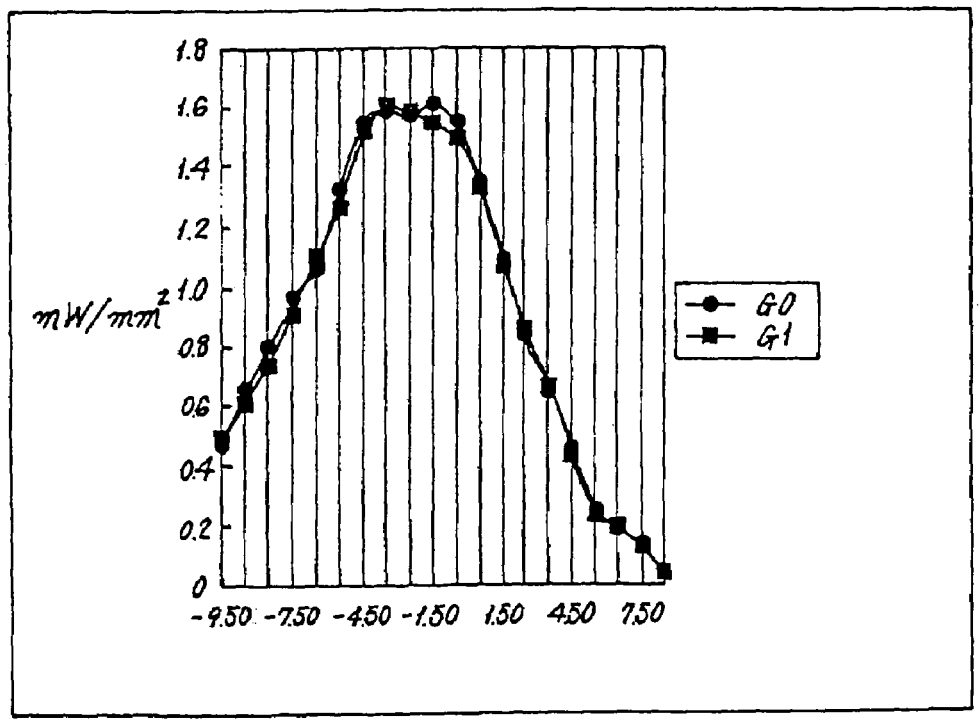
FIG. 34 is a drawing that depicts a luminance distribution in the sub-scanning direction according to the fifteenth example.

FIG. 34 is a graph that depicts a luminance distribution in the sub-scanning direction according to the fifteenth example. The width of the flat portion is about 5.3 millimeters on G0, and about 5.0 millimeters on G1, and the rate of luminance change in the reading set area is about 3.3% in G0, and that in G1 is about 5.0%, which is greater. The half-value width was about 10.5 millimeters.

By illuminating from both of the sides, luminance about two times greater than the luminance in the fifth example was obtained, and a luminance distribution curve that is comparatively close to a symmetric shape was also obtained. When the same light-source unit as the first light-source unit, that is, the structure used in the fifth example, as it is, is used as the second light-source unit, a further symmetric distribution is obtained.

When space in the lighting device allows, the number of the light-source units is not necessarily limited to two. Although not shown in figures, it is clear that, by increasing the number of the light-source units to three, four or more, a brighter lighting process is available.

The following description, which exemplifies a structure of a lighting device in which the light utilization efficiency and the luminance flat-portion range are exemplarily designed, depicts a change in luminance distribution due to an installation error.

Figure 41A:
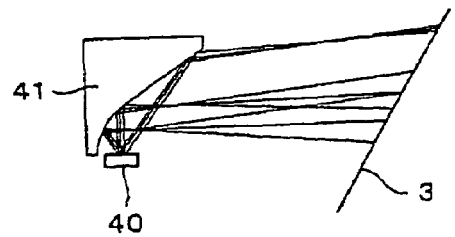
FIGS. 41A to 41C are drawings that explain the structure of a lighting device in which the light utilization efficiency and the luminance flat-portion range are exemplarily designed.
Figure 41B:
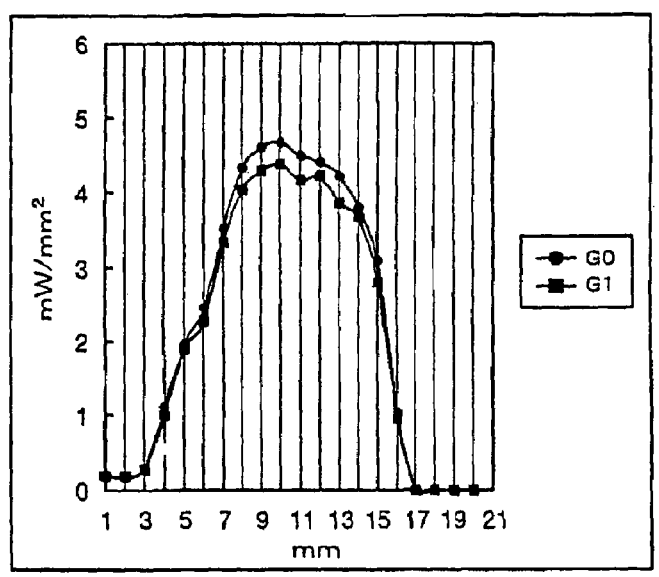
Figure 41C:
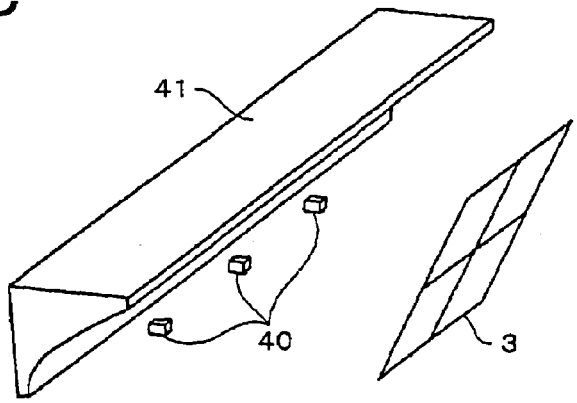

FIGS. 41A to 41C are drawings that explain the structure of a lighting device in which the light utilization efficiency and the luminance flat-portion range are exemplarily designed. FIG. 41A is a light-ray drawing; FIG. 41B is a drawing that depicts a luminance distribution curve on the illumination face; and FIG. 41C is a perspective view that depicts the layout.

Specifications in the present example are as follows:

| Reflecting mirror cross section | parabolic line R = 4.0; K = −1; H = 18 |
|---|---|
| Number of light sources | n = 3 |
| Light source size | a = 1 |
| Light source position | x = 0.15, y = 0 |
| Document face position | L = 22.85 |
| Document face angle | θ = 30 degrees |

The luminance distribution curve shown in FIG. 41B forms a moderate curve, and at the first glance, it seems that there is no flat portion; however, when viewed in a range from the greatest value to the value of 12% smaller than the greatest value in the peripheral portion including the greatest value, the flat portion is present with a width of about 5 millimeters on curve G0 and with a width of about 5 millimeters on curve G1. In place near the center of the width of the flat portion, a width of 3 millimeters in the vicinity including the greatest value is specified from the viewpoint of easiness for positional determination, and the rate of change is observed; thus, the rate of change is about 6% on curve G0, which is greater than that on curve G1 of about 3.6%. With respect to the entire device, although the illumination position is fixed, the lighting device is designed to be slightly adjustable so that the greatest luminance can be given to the illumination position as long as deviations from the designed value are not so big. As to what degree of adjusting margin is prepared, it is determined upon designing, and the margin is sufficiently set to the same level as a width (3 millimeters in example) including the permissible error range of the width of the illumination face.

Thus, the lighting device having this structure is of course applicable to monochrome-image-use devices, and also applicable to color-image-use devices.

However, when this structure is used, upon occurrence of a relative positional deviation between the reflecting mirror and the light source (light-emitting element), the change in luminance distribution becomes greater.

FIGS. 42A to 42F are drawings which depict a luminance distribution upon occurrence of a deviation in the lighting device shown in FIGS. 41A to 41C.

Each of FIGS. 42A and 42B depicts a luminance distribution upon occurrence of a positional deviation in the light-axis direction in the light source.

Each of FIGS. 42C and 42D depicts a luminance distribution upon occurrence of a positional deviation in a longitudinal direction with respect to the light axis in the light source.

Each of FIGS. 42E and 42F depicts a luminance distribution upon occurrence of a tilt in the light-emitting element with respect to the light axis. Each of the deviation and tilt as described above is indicated by a relative positional relationship between the light source and the reflecting mirror.

For example, FIGS. 42A and 42B depict luminance distributions that are obtained when the relative positional relationship between the reflecting mirror and the light-emitting element is offset by 0.3 millimeter forward and backward in the X-axis direction. In this case, the flatness in the luminance distribution in the reading settable area (±3 millimeters near 10 in the lateral scale in the graph) is lowered, resulting in problems.

Moreover, when, as shown in FIG. 42C, the relative positional relationship between the reflecting mirror and the light-emitting element is shifted by 0.3 millimeter in the plus direction on the Y-axis, the flatness in the luminance distribution is not lowered; however, as shown in FIG. 42D, when the light-emitting element is shifted by 0.3 millimeter in the minus direction on the Y-axis, the flatness in the luminance distribution is lowered. Here, the reason that the shift amount of the light-emitting element is set to ±0.3 is because the permissible manufacturing error should be limited to this range. In other words, the objective is to confirm whether the setting of ±0.3 is available as designing tolerance. This value is a great value that corresponds to several times greater than the tolerance in the photographic lens; thus, by setting this value as the tolerance, it is possible to eliminate problems in manufacturing processes.

Even when, as shown in FIGS. 42E and 42F, a great tilt with ±10 degrees occurs between the reflecting mirror and the light-emitting element, the present example makes it possible to maintain a luminance distribution that causes no problems in practical use on the illumination face; therefore, in the present example, a relative tilt between the reflecting mirror and the light-emitting element raises no problems. In other words, when the light-emitting face of the light-emitting element is tilted by 10 degrees toward the reflecting mirror side at a position with ±3 millimeters from the lateral scale of 10 in the graph, a flat portion of about 5 millimeters is formed on each of curves G0 and G1 with the rate of change in the reading set area being set to 4% in G0 and 10.8% in G1, and when the light-emitting face of the light-emitting element is tilted by 10 degrees toward the illumination face side, a flat portion of about 6 millimeters is formed on each of curves G0 and G1 with the rate of change in the reading set area being set to 8% in G0 and 5.1% in G1.

As described above, in the present invention, by increasing the incident-light diffusing function of the optical element (reflecting mirror in the present example) by a predetermined amount, luminance irregularities are reduced; however, the increased diffusing function of course causes a reduction in luminance on the illumination face. When the light-emitting quantity of the light-emitting element is great, no problems are raised; however, since the present invention is based on the assumption that the quantity of light of the light-emitting element is small, two rows of light-emitting elements are arranged to increase the luminance in the present example. Since the diffusing function of the reflecting mirror in intensified, light rays released from positions except for an appropriate light-source position are directed to the illumination face without being converged. Therefore, this structure makes it possible to increase the luminance in comparison with light-emitting elements in one row, without causing luminance irregularities.

Figure 43A:
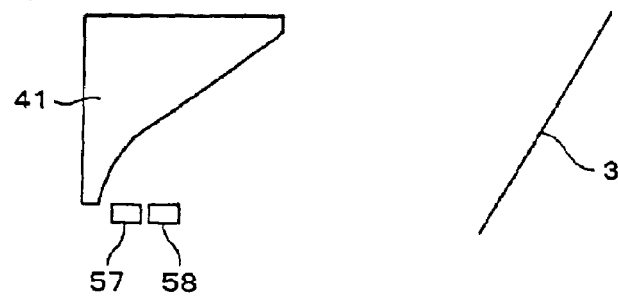
FIGS. 43A to 43C are drawings that depict a structure of a sixteenth example.
Figure 43B:
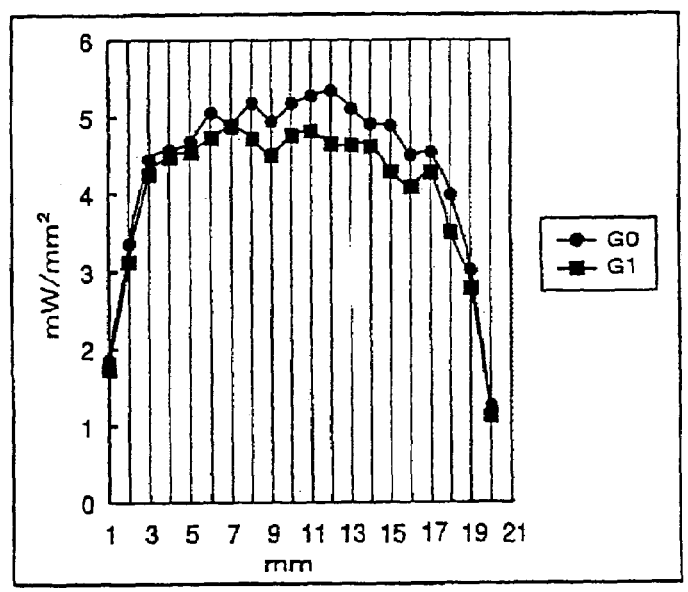
Figure 43C:
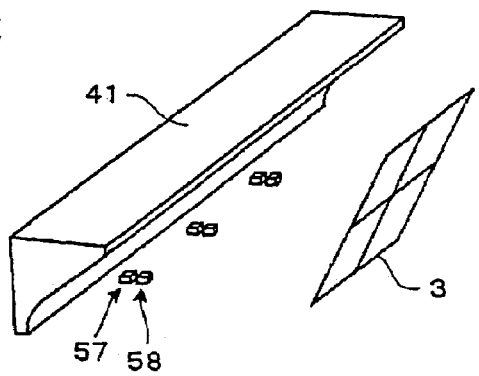

FIGS. 43A to 43C are drawings that depict a structure of a sixteenth example. FIG. 43A is a structural drawing; FIG. 43B is a drawing that depicts a luminance distribution curve on the illumination face; and FIG. 43C is a perspective view that depicts a layout state. The reference numerals 57 and 58 respectively depict light-emitting element rows.

The light-emitting elements rows 57 and 58 are aligned in the symmetric axis direction of a quadratic curve, and the two rows are integrally arranged by a substrate, not shown.

Specifications in the sixteenth example are as follows:

| | |
|---|---|
| Reflecting mirror cross section | hyperbolic line |
| | R = 4.0; K = −1.2 |
| Number of light sources | n = 6 |
| Light source size | a = 1 |
| Light source position | x = −0.55, 0.55 (x coordinate in each row) |
| | y = 0 (in each of two rows) |
| Document face position | L = 23.4, 22.3 |
| (document face positions for the left row and right row in FIG. 43A) | |
| Document face angle | θ = 30 degrees |

In the sixteenth example, both of the coordinates of the light sources of the two rows are set to 0; however, it is not necessarily an indispensable requirement to set the two at the same value.

FIGS. 44A to 44D are drawings which depict a luminance distribution upon occurrence of a deviation in the lighting device shown in FIGS. 43A to 43C.

Figure 44A:
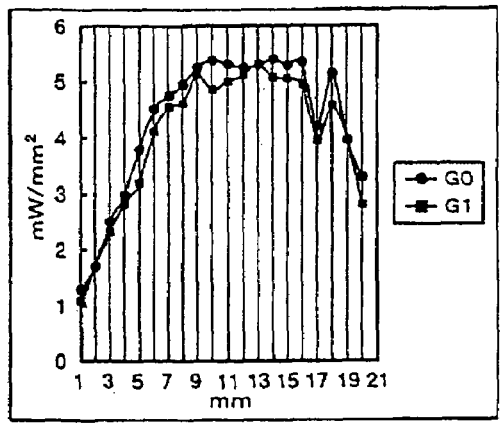
FIGS. 44A to 44D are drawings which depict a luminance distribution upon occurrence of a deviation in the lighting device shown in FIGS. 43A to 43C.
Figure 44B:
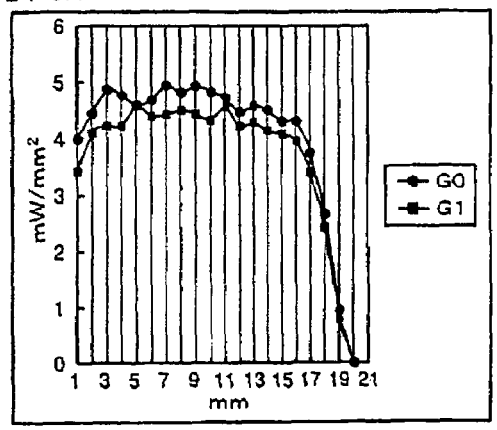

Each of FIGS. 44A and 44B depicts a luminance distribution upon occurrence of a positional deviation in the light source in the light axis direction.

Figure 44C:
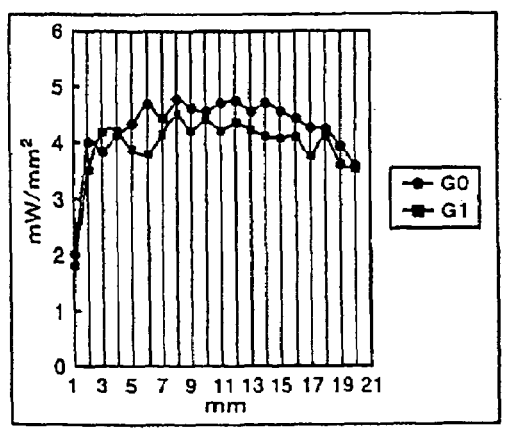
Figure 44D:
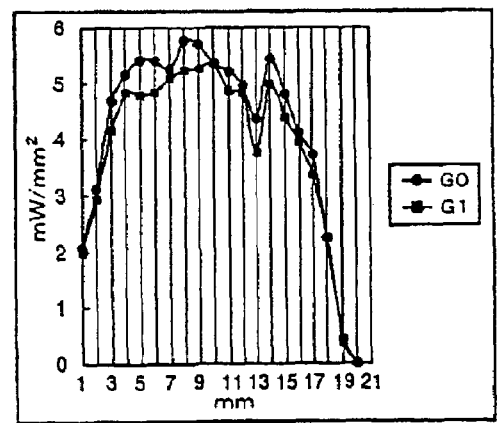

Each of FIGS. 44C and 44D depicts a luminance distribution upon occurrence of a positional deviation in the light source in a longitudinal direction with respect to the light axis. Here, the light source to be subjected to a positional deviation has a structure with integrated two rows of light-emitting elements.

As shown in FIGS. 44A to 44D, the application of the arrangement of the present invention makes it possible to reduce luminance irregularities due to a relative positional deviation between the reflecting mirror and the light-emitting element without causing a reduction in the luminance, in comparison with the arrangement of the lighting device examplarily designed as described above. In the present arrangement, as shown in FIG. 44B, the flat portion is about 10 millimeters on curve G0, and about 11 millimeters on curve G1, which are considerably wide. Since the reading set area is different between G0 and G1, the sizes of the respective flat portions (approximate values) in FIGS. 44A to 44B, which are obtained when it is supposedly set at positions ±10 from the lateral scale 10 of the graph, are shown below. The amount of change in the position of the light-emitting element is indicated on the left side of the arrow, and the width of the flat portion is indicated on the right side thereof, respectively.

FIG. 44A: x=−0.3 millimeter→G0; 10 millimeters, G1; 10 millimeters

FIG. 44B: x=+0.3 millimeter→G0; 10 millimeters, G1; 10 millimeters

FIG. 44C: y=−0.3 millimeter→G0; 12 millimeters, G1; 10 millimeters

FIG. 44D: y=+0.3 millimeter→G0; 9 millimeters, G1; 9 millimeters

As shown above, the width of the flat portion is sufficiently maintained in any of the cases.

Moreover, supposing that the reading set area is at a range of ±3 from the lateral scale 10 in the graph, the rate of change within the range is shown below: The amount of change is indicated on the left side of the arrow in the same manner, and the rate of change is indicated on the right side thereof, respectively.

FIG. 44A: x=−0.3 millimeter→G0; 5.5%, G1; 2.3%

FIG. 44B: x=+0.3 millimeter→G0; 7.1%, G1; 2.6%

FIG. 44C: y=−0.3 millimeter→G0; 1.4%, G1; 4.6%

FIG. 44D: y=+0.3 millimeter→G0; 7.6%, G1; 9.9%

As shown above, the rate of change in luminance is sufficiently maintained within the target value in any of the cases.

Thus, the application of the present arrangement makes it possible to provide a lighting system that is free from a reduction in luminance, and less susceptible to installation errors. In an attempt to provide a further stable device, the rows of light-emitting elements may be increased to three rows or more.

Figure 45A:
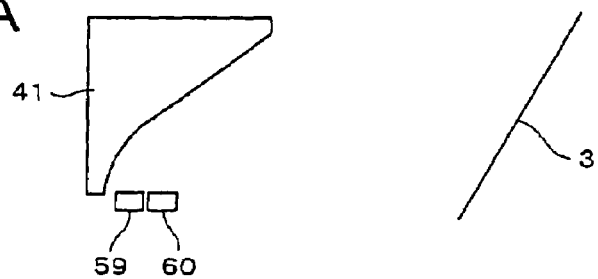
FIGS. 45A to 45C are drawings that depict a structure of a seventeenth example.
Figure 45B:
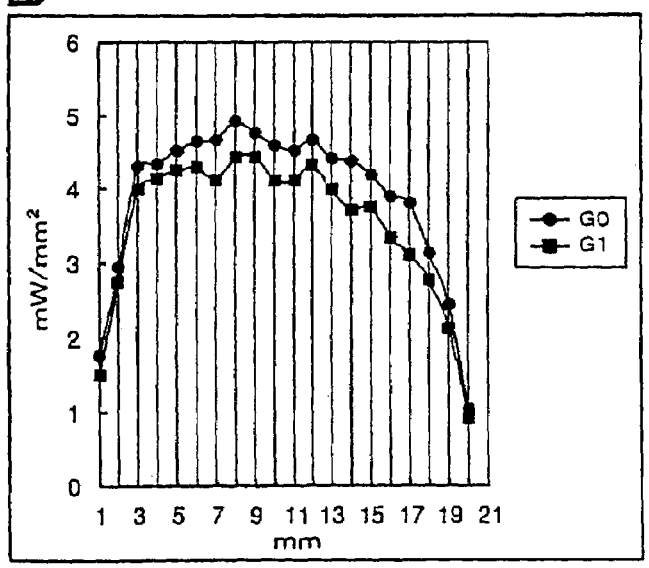
Figure 45C:
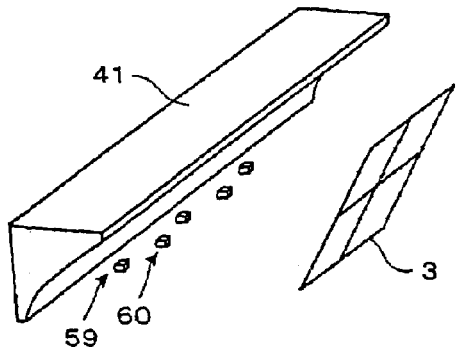

FIGS. 45A to 45C are drawings that depict a structure of a seventeenth example. FIG. 45A is a structural drawing; FIG. 45B is a drawing that depicts a luminance distribution curve on the illumination face; and FIG. 45C is a perspective view that depicts a layout state. The reference numerals 59 and 60 respectively represent a first light-emitting element row and a second light-emitting element row.

The problem with this method in which two rows of light-emitting elements are simply aligned as shown in the sixteenth example is that light-emitting elements on one row and adjacent light-emitting elements on the other row mutually apply heat to each other. Therefore, as shown in FIG. 45C, a so-called staggered arrangement in which between light-emitting elements on one row, for example, the element row 59, each light-emitting element on the adjacent light-emitting element row 60 is placed is prepared so that this problem can be alleviated.

Specifications in the structure of the seventeenth example are as follows:

| | |
|---|---|
| Reflecting mirror cross section | hyperbolic line |
| | R = 4.0; K = −1.2 |
| Number of light sources | n = 5 |
| Light source size | a = 1 |
| Light source position | x = −0.55, 0.55 (x coordinate in each row) |
| | y = 0 (in each of two rows) |
| Document face position | L = 23.4, 22.3 |
| (document face positions for the left row and right row in FIG. 45A) | |
| Document face angle | θ = 30 degrees |

Figure 46A:
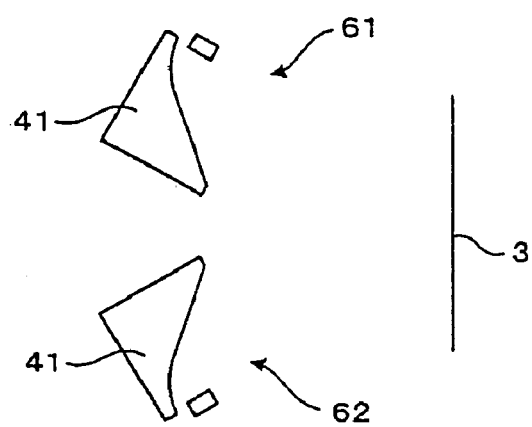
FIGS. 46A to 46C are drawings that depict a structure of an eighteenth example.
Figure 46B:
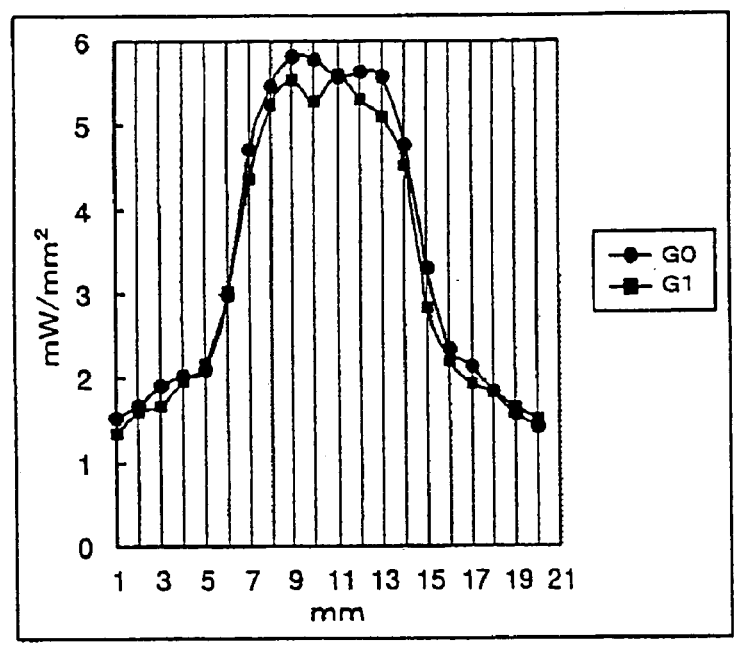
Figure 46C:
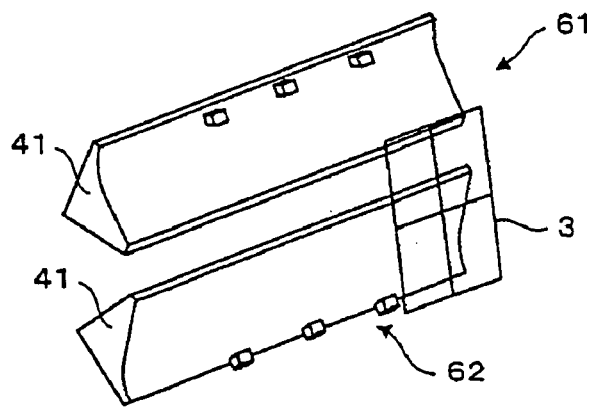

FIGS. 46A to 46C are drawings that depict a structure of an eighteenth example. FIG. 46A is a structural drawing; FIG. 46B is a drawing that depicts a luminance distribution curve on the illumination face; and FIG. 46C is a perspective view that depicts a layout state. The reference numerals 61 and 62 respectively represent a first light-source unit and a second light-source unit.

With respect to a method different from the method of the seventeenth example that compensates for a luminance reduction on the illumination face, a method in which a plurality of light-source units are installed is proposed. This method provides a high degree of divergence in the reflective mirror with a wide flat portion; therefore, set position errors of the light-source unit with respect to the illumination face cause no problems, as long as they are small.

The two light-source units 61 and 62, shown in FIG. 46A, are the same, and are placed symmetrically with respect to the normal in the center of the reading area of the illumination face.

Specifications in the structure of the eighteenth example are as follows:

| Reflecting mirror cross section | hyperbolic line R = 4.0; K = −1.3 |
| --- | --- |
| Number of light sources | n = 6 |
| Light source size | a = 1 |
| Light source position | x = 0.15, y = 0 |
| Document face position | L = 22.85 |
| Document face angle | θ = +30 degrees |

With respect to the setting of the coordinate axes, the coordinate axes, defined in the explanation of FIG. 12, are individually set for the respective reflecting mirrors.

Figure 47A:
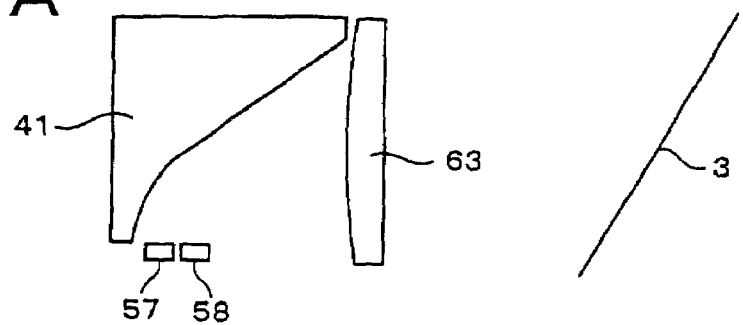
FIGS. 47A to 47C are drawings that depict a structure of a nineteenth example.
Figure 47B:
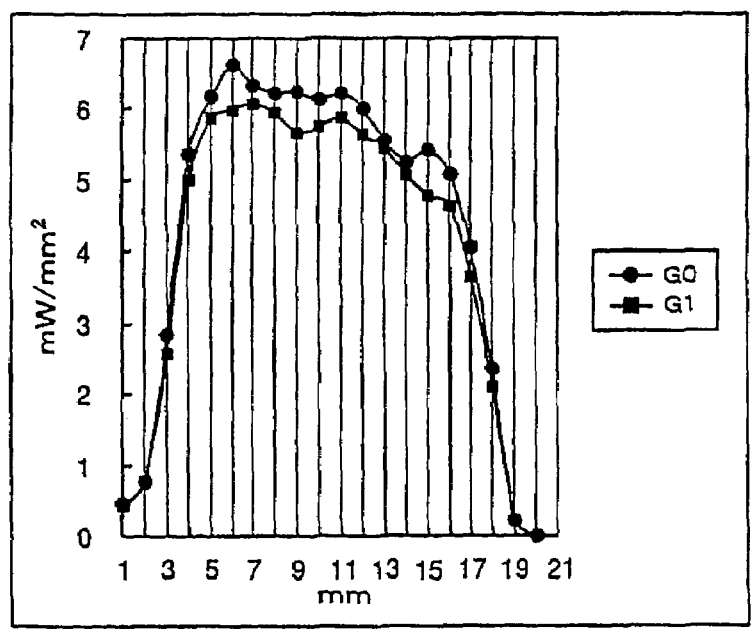
Figure 47C:
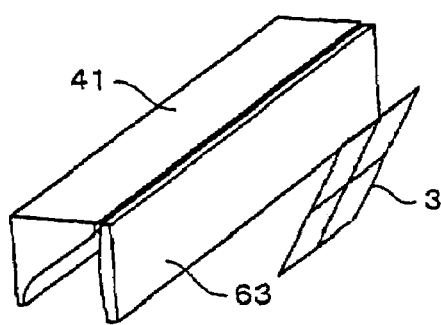

FIGS. 47A to 47C are drawings that depict a structure of a nineteenth example. FIG. 47A is a structural drawing; FIG. 47B is a drawing that depicts a luminance distribution curve on the illumination face; and FIG. 47C is a perspective view that depicts a layout state. The reference numeral 63 represents a cylindrical lens.

In the sixteenth example explained above, by increasing the degree of incident-light diffusion, the relative positional deviation tolerance between the reflecting mirror and the light-emitting element is alleviated; however, when the flat portion is unnecessarily wide, with light from the light-emitting element being very weak, the luminance tends to become insufficient. Therefore, the cylindrical lens 63 is placed at the light-releasing opening section of the reflecting mirror so that by converging light to such a degree not to increase luminance irregularities, the luminance is increased.

Specifications in the structure of the nineteenth example are as follows:

| Reflecting mirror cross section | hyperbolic line R = 4.0; K = −1.2 |
| --- | --- |
| Number of light sources | n = 5 |
| Light source size | a = 1 |
| Light source position | x = −0.55, 0.55 (X-axis coordinate of each row), y = 0 (the same in two rows) |
| Document face position (document face position for each of the left and right rows in FIG. 47A) | L = 23.4, 22.3 |
| Document face angle | θ = 30 degrees |

Lens glass material Refractive index (d line); 1.517 dispersion; 64.2 Curvature radius Supposing that the face closer to the reflecting mirror on the X-axis is R1 face and that the face on the opposite side is R2, R1=35 millimeters, R2=100 millimeters

| Lens thickness | 2 millimeters |
| --- | --- |
| Lens light axis | y = 5 millimeters |

By using the arrangement of the nineteenth example, it becomes possible to increase luminance in comparison with the sixteenth example. However, from the viewpoint of costs, this arrangement is not necessarily required when the quantity of light emission of the light-emitting element is sufficient.

Since the position of the maximum luminance can be shifted by changing the level of the lens light axis, the installation position of the cylindrical lens is utilized for adjustments. Here, when the length in the main scanning direction is not so long, a slight refracting force may be prepared in the main scanning direction. In this case, not a cylindrical lens, but an anamorphotic lens is used.

FIG. 48 is a drawing that schematically depicts a light-emitting-element-use lens that is suitable for the lighting device of the present invention. The reference numeral 64 represents an LED, 65 represents a light-emitting unit, and 66 represents a lens unit, respectively. In the present example, different from the sixteenth example to the nineteenth example, not an example for the entire structure of a lighting system, but an example for a light-emitting element suitable for the scanner-use lighting system of the present invention is described.

As shown in FIG. 4, light-emitting elements in which a semi-spherical lens unit 25 is integrally attached to the tip of an LED 22 to narrow the light-releasing direction and consequently to improve the directivity have been put in the market. However, in the case when the element of this type is used in the present invention, since the directivity of the light-emitting element is high with respect to all the directions, a luminance irregularity tends to occur in the main-scan reading direction.

In the present invention, as shown in FIG. 48, to solve this problem, the LED 64 in which the cylindrical lens 66 is placed right above the light-emitting unit 65 is preferably used. The application of the cylindrical lens 66 of this type makes it possible to converge light in the sub-scanning direction without converging light in the main-scanning direction; therefore, this arrangement is exemplarily used for lighting an illumination face that is elongated in one direction.

Figure 35:
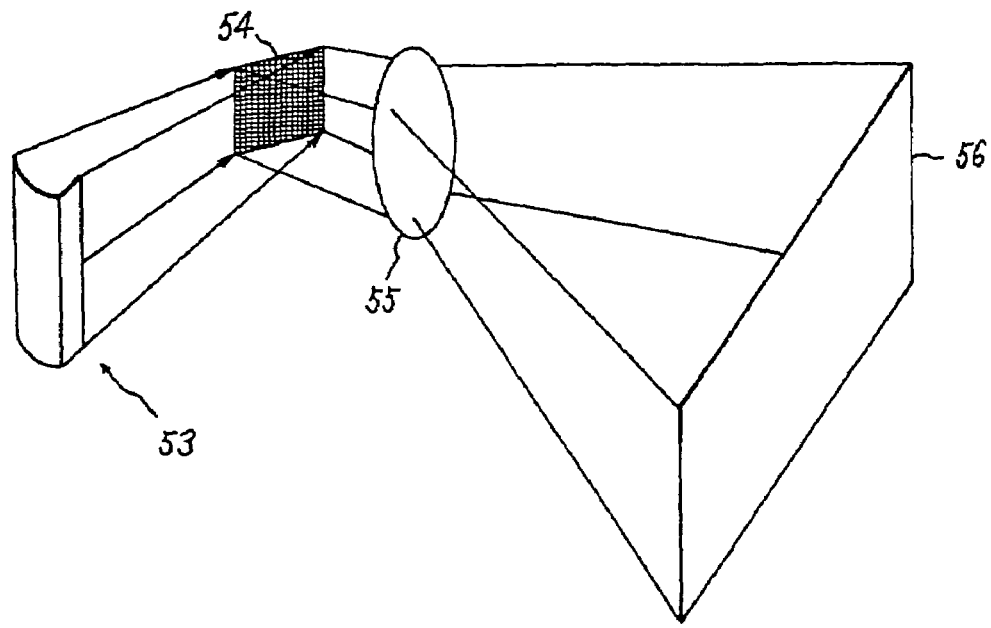
FIG. 35 is a drawing that depicts an example in which the lighting device of the present invention is used as a projector.
Figure 36:
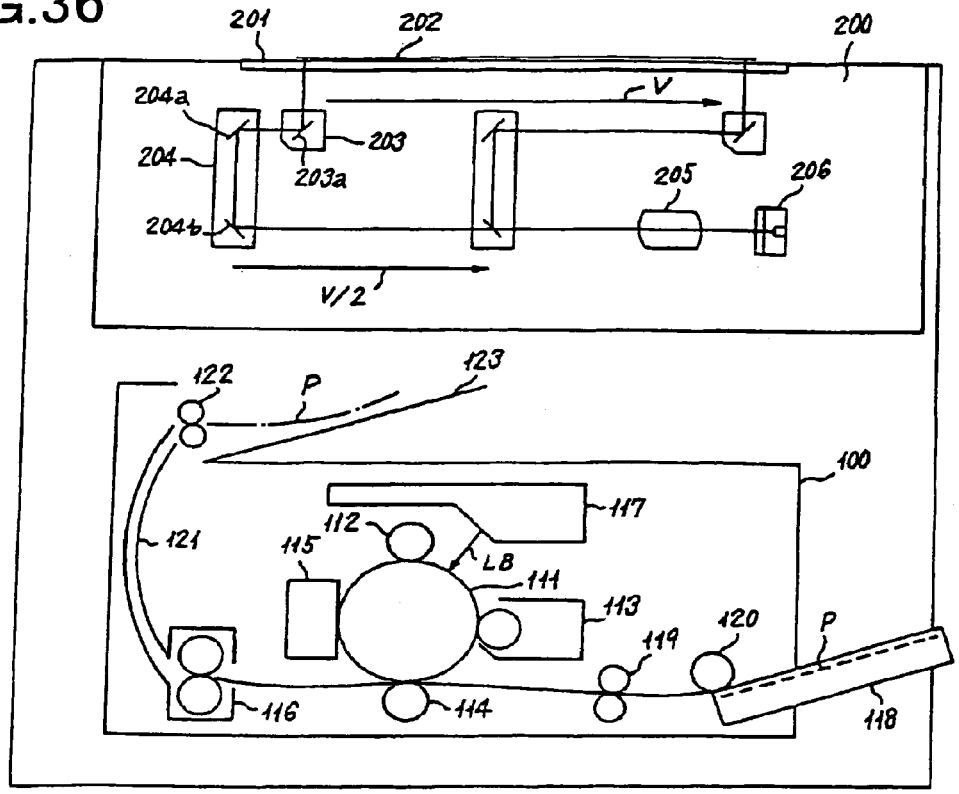
FIG. 36 is a schematic diagram that depicts an image-forming apparatus having an image-reading device.

FIG. 35 is a projection apparatus (projector) in which the lighting device of the present invention can be used. The reference numeral 53 represents a lighting device, 54 represents an image display element, 55 represents a projection lens, and 56 represents a screen, respectively.

A reflection-type display element, typically represented by a DMD (Digital Micromirror Device), is used for the image display element 54.

Light rays,.released from the lighting device 53, are made incident on the image display element 54 serving as an illumination face. In the case of the DMD, a reflecting mirror that has a fine size and forms a pixel is used for switching the reflecting direction to either of two directions in response to image information that has been inputted in a separate manner. Light rays having entered the projection lens 55 placed at a position corresponding to one of the reflection directions are converged to form an image on the screen 56; thus, an image-displaying process is carried out. The image to be projected may be either of still images and motion images.

The lighting device of the present invention can be used in an image forming apparatus such as copiers, printers, multifunctional peripherals.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lighting device comprising:
   an illumination face that reflects and/or absorbs light and including a length and a width;
   a light-emitting element including a light emitting diode and a light-ray-releasing face, a maximum length of which light-ray-releasing face is equal to or less than the width of the illumination face; and a light-source unit that has an optical element which changes the direction of light rays released from the light-emitting element to be directed to the illumination face, wherein the optical element has a concave-face reflecting unit including a cross section that is shaped into a quadratic curve or a pseudo quadratic curve (hereinafter, "a quadratic curve"), which is placed at least on one portion thereof, and a luminance distribution on the illumination face has a flat portion that is substantially equal to the width of the illumination face, the concave-face reflecting unit being constituted by a curve that is located on one side when viewed from the vicinity of an apex of the quadratic curve and a symmetric axis of the quadratic curve.

2. The lighting device according to claim 1, wherein the optical element includes at least one of a transparent glass and a synthetic resin, and has a light-ray incident face facing the light-emitting element and a light-ray releasing face that is virtually orthogonal to the light-ray incident face, and faces the illumination face, with the two faces being connected by the concave-face reflecting unit.

3. The lighting device according to claim 2, wherein the light-ray releasing face of the light-emitting element is parallel to the symmetric axis of the quadratic curve.

4. The lighting device according to claim 2, wherein the light-ray releasing face of the light-emitting element is tilted by a predetermined angle with respect to the symmetric axis of the quadratic curve.

5. The lighting device according to claim 4, wherein the predetermined angle corresponds to an angle at which the maximum quantity of light is made incident on an effective reflection area of the concave-face reflecting unit.

6. The lighting device according to claim 1, wherein the illumination face is tilted by a predetermined angle with respect to the symmetric axis of the quadratic curve.

7. The lighting device according to claim 1, wherein the light-emitting element has a center that is placed at a focal point of the quadratic curve, or placed at a distance within the length of the light-ray releasing face of the light-emitting element from the focal point.

8. The lighting device according to claim 1, wherein the quadratic curve is an ellipse.

9. The lighting device according to claim 1, wherein the quadratic curve is a parabolic line.

10. The lighting device according to claim 1, wherein the quadratic curve is a hyperbolic line.

11. The lighting device according to claim 1, wherein the pseudo quadratic curve corresponds to a curve that is approximated to a quadratic curve by connecting partial straight lines.

12. The lighting device according to claim 1, wherein the light-emitting element is packaged on a circuit substrate.

13. The lighting device according to claim 12, wherein the circuit substrate is coupled to the optical element.

14. The lighting device according to claim 1, wherein the light-emitting diode is of a reflection type.

15. The lighting device according to claim 1, wherein the light-emitting diode is a 1-chip-type white light-emitting diode including a fluorescent material.

16. The lighting device according to claim 1, wherein the light-emitting diode is a white light-emitting diode including at least two or more chips including respectively different light-emitting colors so that white light is emitted based on a mixing of the different light-emitting colors.

17. The lighting device according to claim 1, wherein a plurality of light-emitting elements are arranged along the length of the illumination face.

18. The lighting device according to claim 17, wherein a distance separating the light-emitting elements is greater than the length of the illumination face.

19. The lighting device according to claim 17, wherein a distance separating the light-emitting elements from each other is equal for each of the light-emitting elements.

20. The lighting device according to claim 17, wherein an interval between the light-emitting elements closest to the center is P0 and an interval from any light-emitting element to a light-emitting element closest to the end is Pn with $n \geq 1$, and a layout interval of the light-emitting elements simultaneously satisfies the following inequalities:

$$Pn-1 \geq Pn$$

$$0.2 \geq Pn/P0 \geq 1.$$

21. The lighting device according to claim 1, further comprising:

two light-source units installed, respectively, on opposite sides of a normal to the illumination face.

22. The lighting device according to claim 21, wherein the two light-source units are light-source units having the same basic specifications.

23. The lighting device according to claim 22, wherein the two light-source units are light-source units having mutually different specifications.

24. The lighting device according to claim 1, wherein the light-ray releasing face is tilted with respect to the symmetric axis of the quadratic curve by a predetermined angle corresponding to an angle at which light rays within a half-value angle in a luminous intensity distribution of the light-emitting element are made incident on an effective reflection area of the concave-face reflecting unit.

25. The lighting device according to claim 1, wherein a plurality of light-emitting elements are arranged in a direction coincident with the symmetric axis direction of the quadratic curve.

26. The lighting device according to claim 25, wherein the plurality of light-emitting elements are packaged on a same circuit substrate.

27. The lighting device according to claim 25, wherein the plurality of light-emitting elements includes a plurality of light-emitting elements arranged in the length direction of the illumination face so that light-emitting element rows that are adjacent to each other in the length direction have a staggered pattern.

28. The lighting device according to claim 1, further comprising:

a lens, which exerts different refracting powers in two directions that are orthogonal to each other, the lens being placed near the light-ray releasing face of the light-emitting element.

29. The lighting device according to claim 1, further comprising:

a lens, which exerts different refracting powers in two directions that are orthogonal to each other, the lens being located between the light-ray releasing opening and the illumination face.

30. A lighting device, comprising:
- an illumination face that reflects and/or absorbs light, and has a predetermined length and width, the lighting device configured to apply light onto the illumination face to utilize reflected light from the illumination face; and
- a light-source unit including a light-emitting element having a light emitting diode; and an optical element that has a light-ray incident opening near a light-ray releasing face of the light-emitting element and a concave-face reflecting unit that has a partially cylindrical shape having a light-ray releasing opening that faces the illumination face, with a cross sectional shape of the concave-face reflecting unit including a quadratic curve or a pseudo quadratic curve (hereinafter, "a quadratic curve"), wherein
- an illumination area derived from light applied from the light-emitting element has a luminance distribution area having a flat portion, with the flat portion being virtually coincident with the illumination face, the concave-face reflecting unit being constituted by a curve that is located on one side when viewed from the vicinity of an apex of the quadratic curve and a symmetric axis of the quadratic curve.

31. The lighting device according to claim 30, wherein the optical element includes at least one of a transparent glass and a synthetic resin, the light-ray incident opening is a light-ray incident face made of a flat face and the light-ray releasing opening is a light-ray releasing face made of a flat face that is virtually orthogonal to the light-ray incident face, with the two flat faces being connected by the concave-face reflecting unit so that light rays are inner-face-reflected by the concave-face reflecting unit.

32. The lighting device according to claim 30, wherein the illumination face is tilted by a predetermined angle with respect to the symmetric axis of the quadratic curve.

33. The lighting device according to claim 30, wherein the light-emitting element has a center that is placed at a focal point of the quadratic curve, or placed at a distance within the length of the light-ray releasing face of the light-emitting element from the focal point.

34. The lighting device according to claim 30, wherein the quadratic curve is an ellipse.

35. The lighting device according to claim 30, wherein the quadratic curve is a parabolic line.

36. The lighting device according to claim 30, wherein the quadratic curve is a hyperbolic line.

37. The lighting device according to claim 30, wherein the light-ray releasing face of the light-emitting element is parallel to the symmetric axis of the quadratic curve.

38. The lighting device according to claim 30, wherein the light-ray releasing face of the light-emitting element is tilted by a predetermined angle with respect to the symmetric axis of the quadratic curve.

39. The lighting device according to claim 38, wherein the predetermined angle corresponds to an angle at which a maximum quantity of light is made incident on an effective reflection area of the concave-face reflecting unit.

40. The lighting device according to claim 30, wherein the pseudo quadratic curve corresponds to a curve that approximates a quadratic curve by connecting partial straight lines.

41. The lighting device according to claim 30, wherein the light-emitting element is packaged on a circuit substrate.

42. The lighting device according to claim 41, wherein the circuit substrate is coupled to the optical element.

43. The lighting device according to claim 30, wherein the light-emitting diode is of a reflection type.

44. The lighting device according to claim 30, wherein the light-emitting diode is a 1-chip-type white light-emitting diode that includes a fluorescent material.

45. The lighting device according to claim 30, wherein the light-emitting diode is a white light-emitting diode including at least two chips having respectively different light-emitting colors so that white light is emitted based on a mixing of the different light-emitting colors.

46. The lighting device according to claim 30, wherein a plurality of light-emitting elements are arranged along the length of the illumination face.

47. The lighting device according to claim 46, wherein a distance separating the light-emitting elements is greater than the length of the illumination face.

48. The lighting device according to claim 46, wherein a distance separating the light-emitting elements from each other is equal for each of the light-emitting elements.

49. The lighting device according to claim 46, wherein an interval between the light-emitting elements closest to the center is P0 and an interval from any light-emitting element to a light-emitting element closest to the end is Pn with $n \geq 1$, and a layout interval of the light-emitting elements simultaneously satisfies the following inequalities:

$$P_{n-1} \geq P_n$$

$$0.2 \geq P_n/P0 \geq 1.$$

50. The lighting device according to claim 30, further comprising:
two light-source units installed, respectively, on opposite sides of a normal to the illumination face.

51. The lighting device according to claim 50, wherein the two light-source units are light-source units having the same basic specifications.

52. The lighting device according to claim 51, wherein the two light-source units are light-source units having mutually different specifications.

53. The lighting device according to claim 30, wherein the light-ray releasing face is tilted with respect to the symmetric axis of the quadratic curve by a predetermined angle corresponding to an angle at which light rays within a half-value angle in a luminous intensity distribution of the light-emitting element are made incident on an effective reflection area of the concave-face reflecting unit.

54. The lighting device according to claim 30, wherein a plurality of light-emitting elements are arranged in a direction coincident with the symmetric axis direction of the quadratic curve.

55. The lighting device according to claim 54, wherein the plurality of light-emitting elements are packaged on a same circuit substrate.

56. The lighting device according to claim 54, wherein the plurality of light-emitting elements includes a plurality of light-emitting elements arranged in the length direction of the illumination face so that light-emitting element rows that are adjacent to each other in the length direction have a staggered pattern.

57. The lighting device according to claim 30, further comprising:

a lens, which exerts different refracting powers in two directions that are orthogonal to each other, the lens being placed near the light-ray releasing face of the light-emitting element.

58. The lighting device according to claim 30, further comprising:

a lens, which exerts different refracting powers in two directions that are orthogonal to each other, the lens being located between the light-ray releasing opening and the illumination face.

* * * * *